(12) United States Patent
Nooraiepour et al.

(10) Patent No.: US 12,555,918 B2
(45) Date of Patent: Feb. 17, 2026

(54) TIME-VARYING METAMATERIAL-ENABLED DIRECTIONAL MODULATION FOR PHYSICAL LAYER SECURITY IN WIRELESS COMMUNICATION LINKS

(71) Applicant: Rutgers, The State University of New Jersey, New Brunswick, NJ (US)

(72) Inventors: Alireza Nooraiepour, New Brunswick, NJ (US); Shaghayegh Vosoughitabar, New Brunswick, NJ (US); Chung-Tse Michael Wu, New Brunswick, NJ (US); Waheed U. Bajwa, New Brunswick, NJ (US); Narayan B. Mandayam, New Brunswick, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 109 days.

(21) Appl. No.: 18/706,608

(22) PCT Filed: Nov. 3, 2022

(86) PCT No.: PCT/US2022/048820
§ 371 (c)(1),
(2) Date: May 1, 2024

(87) PCT Pub. No.: WO2023/129273
PCT Pub. Date: Jul. 6, 2023

(65) Prior Publication Data
US 2025/0038421 A1    Jan. 30, 2025

Related U.S. Application Data

(60) Provisional application No. 63/275,391, filed on Nov. 3, 2021.

(51) Int. Cl.
H01Q 13/28    (2006.01)
H01Q 1/38    (2006.01)
H01Q 3/26    (2006.01)

(52) U.S. Cl.
CPC ............... *H01Q 13/28* (2013.01); *H01Q 1/38* (2013.01); *H01Q 3/26* (2013.01)

(58) Field of Classification Search
CPC ............ H01Q 13/28; H01Q 1/38; H01Q 3/26; H01Q 15/0086; H04B 1/04; H04L 27/2601
See application file for complete search history.

(56) References Cited

U.S. PATENT DOCUMENTS 7,446,712 B2    11/2008  Itoh et al.
10,014,585 B2*  7/2018  Patron ................... H01Q 13/28
(Continued)

OTHER PUBLICATIONS

International Search Report & Written Opinion for corresponding PCT Application No. PCT/US2022/048820, dated Jul. 17, 2023.
(Continued)

*Primary Examiner* — Seung H Lee
(74) *Attorney, Agent, or Firm* — Meagher Emanuel Laks Goldberg & Liao, LLP

(57) ABSTRACT

Various embodiments comprise systems, methods, architectures, mechanisms and apparatus providing secure physical layer (PHY) transmission via metamaterial (MTM) leaky-wave antennas (LWAs) using directed modulation (DM) transmitters such as for orthogonal frequency-division multiplexing (OFDM) and non-contiguous (NC) OFDM transmissions, where the DM functionalities exploit the property of time-modulated arrays (TMAs) realized in 1-D and 2-D spaces through the MTM-LWAs.

16 Claims, 22 Drawing Sheets

(56) References Cited

U.S. PATENT DOCUMENTS

| | | | |
|---|---|---|---|
| 11,128,375 B2* | 9/2021 | Tam | H04B 10/25133 |
| 2006/0028386 A1 | 2/2006 | Ebling et al. | |
| 2011/0248797 A1 | 10/2011 | Caloz et al. | |
| 2011/0254727 A1 | 10/2011 | Kam et al. | |
| 2011/0267244 A1* | 11/2011 | Rajgopal | H01Q 1/38 |
| | | | 29/601 |
| 2012/0076498 A1 | 3/2012 | Sayeed et al. | |
| 2017/0062943 A1 | 3/2017 | Patron et al. | |
| 2020/0136726 A1 | 4/2020 | Tam et al. | |

OTHER PUBLICATIONS

European Search Report, issued Sep. 24, 2025 corresponding to EP Application No. 22917144.2, filed Nov. 3, 2022.
Daly, M.P., et al.: "Directional Modulation Technique for Phased Arrays"; IEEE Transactions On Antennas and Propagation, IEEE, USA; vol. 57, No. 9; pp. 2633-2640; Sep. 1, 2009.
Alibakhshikenari Mohammad, et al.; "A Comprehensive Survey of "Metamaterial Transmission-Line Based Antennas: Design, Challenges, and Applications""; IEEE Access, IEEE, USA; pp. 14478-144808; Jul. 31, 2020.

* cited by examiner

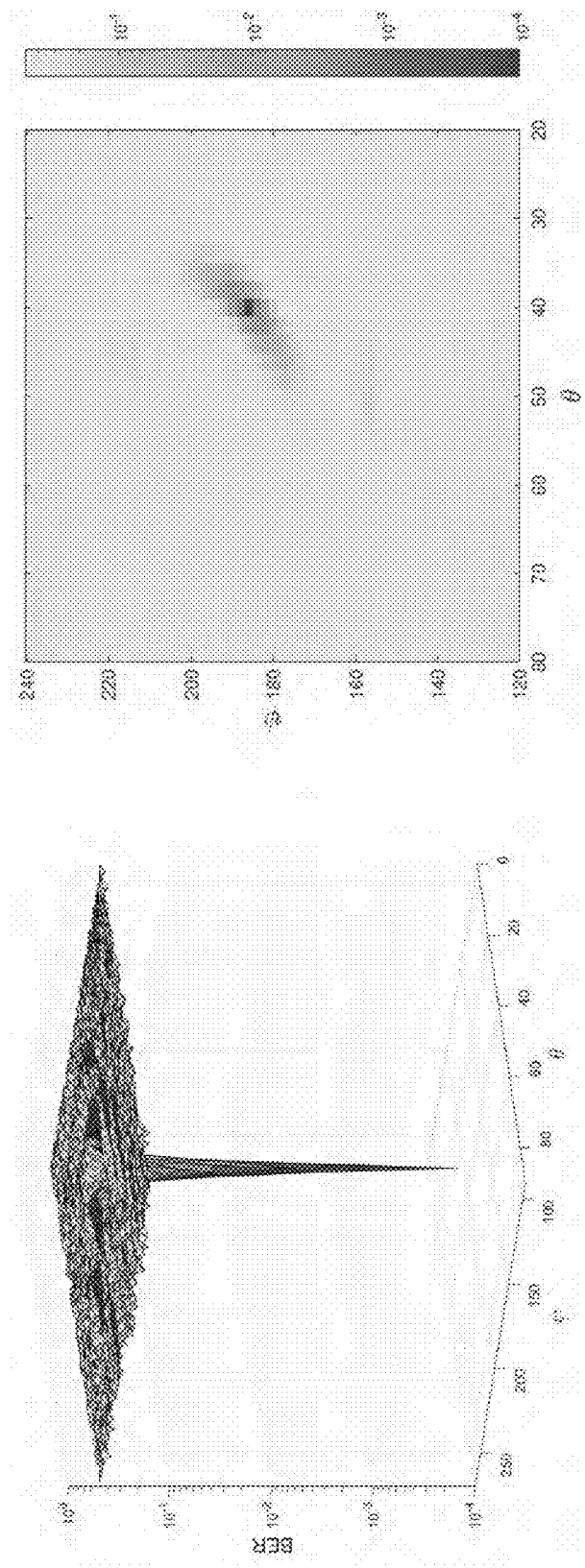

TIME-VARYING METAMATERIAL-ENABLED DIRECTIONAL MODULATION FOR PHYSICAL LAYER SECURITY IN WIRELESS COMMUNICATION LINKS

CROSS-REFERENCE TO RELATED APPLICATION

This application claims the benefit of provisional patent application Ser. No. 63/275,391 filed on Nov. 3, 2021, entitled TIME-VARYING METAMATERIAL-ENABLED DIRECTIONAL MODULATION FOR PHYSICAL LAYER SECURITY IN WIRELESS COMMUNICATION LINKS, which provisional patent application is incorporated herein by reference in its entirety.

GOVERNMENT INTEREST

This invention was made with government support under grant number ECCS-1818478 and ECCS-2028823 awarded by the NSF. The government has certain rights in the invention.

FIELD OF THE DISCLOSURE

The present disclosure generally relates to wireless communications and, in particular, to secret wireless communications.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Secret wireless communications systems are typically vulnerable to one or both of passive attacks and physical layer (PHY) spoofing attacks. Passive attacks are when an adversary is merely listening to an ongoing transmission with the aim of inferring secret messages without any form of communication with the legitimate parties. PHY spoofing attacks are where an adversary overhears the signals sent by a transmitter to a receiver, with a goal of sending spurious data to the receiver that have similar PHY characteristics as exhibited by the transmitter.

SUMMARY

Various deficiencies in the prior art are addressed by systems, methods, architectures, mechanisms and apparatus providing secure physical layer (PHY) transmission using metamaterial (MTM), leaky-wave antenna (LWA), and directional modulation. Various embodiments propose transmission architectures to enhance the physical layer security through the utilization of MTM-LWAs, such as via directed modulation (DM) transmitters for orthogonal frequency-division multiplexing (OFDM) and non-contiguous (NC) OFDM transmissions where the DM functionalities exploit the property of time-modulated arrays (TMAs) realized in 1-D and 2-D spaces through the MTM-LWAs.

A transmitter according to an embodiment comprises first and second leaky-wave antennas (LWAs), each LWA comprising a predefined number of microstrip unit cells separated from each other by a distance p, each first LWA microstrip unit cell cooperating with a corresponding second LWA microstrip unit cell to form thereby a respective unit cell stage having two inputs and two outputs; an input switch, for alternatively coupling an input signal for transmission to unit cell inputs of a first unit cell stage; a plurality of DPDT switches, each DPDT switch disposed between respective prior and subsequent unit cell stages, each DPDT switch alternately coupling prior unit cell stage output signals to subsequent unit cell stage unit inputs; and an output switch, for alternatively coupling final unit cell stage output signals to an output to provide thereby an transmission signal; wherein the DPDT switches are controlled in a manner causing directional modulation of the transmission signal such that the transmission signal exhibits a low bit error rate (BER) to a receiver at a desired location.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 12A-12B graphically illustrate BER performance of a receiver in 2D space when Tx is using time-modulated parallel feeding with plain CRLH LWA for transmission, wherein N=10, N'=20;

Figure 1A:
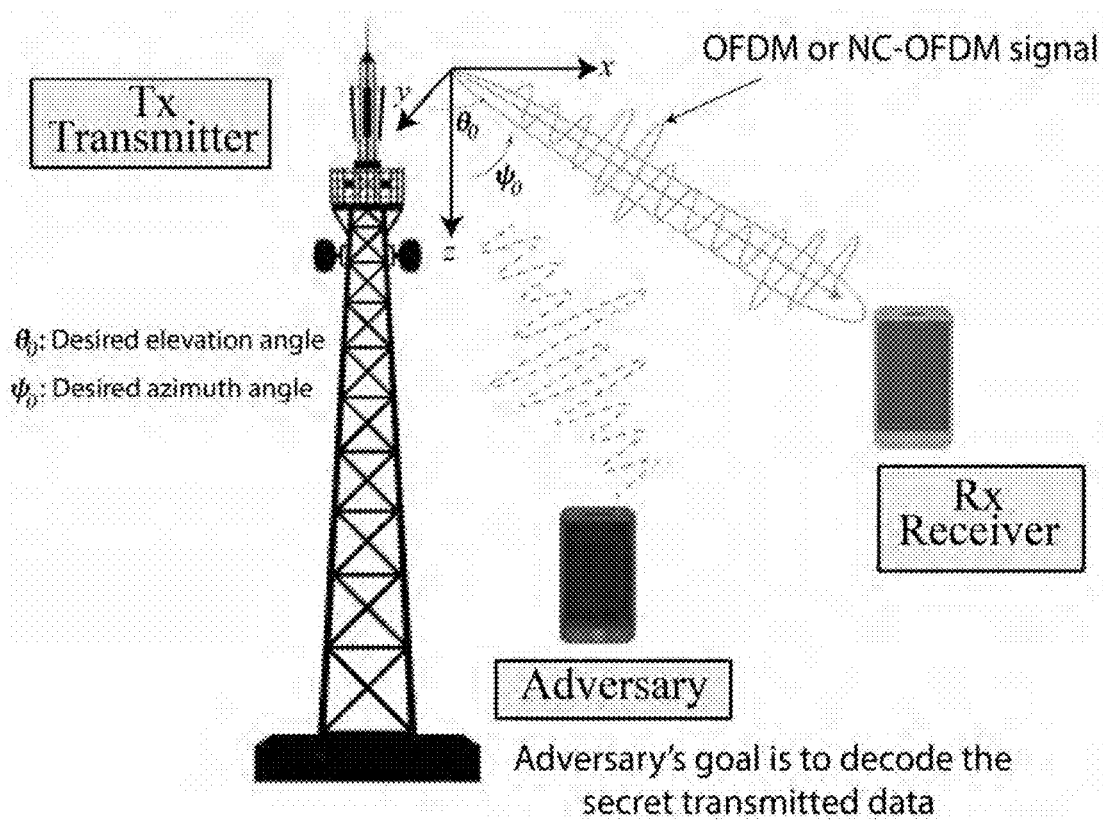
FIGS. 1A-1B graphically illustrate passive and active adversarial actions against transmission of a signal.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments may be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide novel transmission schemes using metamaterial (MTM), leaky-wave antenna (LWA), along with directional modulation, for enhancing physical layer (PHY) security. MTM-LWAs, which offer compact, integrated, and cost-effective alternatives to the classic phased-array architectures, are particularly of interest for emerging wireless communication systems including Internet-of-Things (IoT).

The embodiments fulfill the functionalities of directed modulation (DM) transmitters for, illustratively, orthogonal frequency-division multiplexing (OFDM) and non-contiguous (NC) OFDM transmissions, while enjoying the implementation benefits of MTM-LWAs. Specifically, various transmitter architectures based on time-modulated MTM-LWA are provided as a solution for physical layer security for the first time. The physical layer security for the proposed schemes are investigated from the point of view of both passive and active attacks where an adversary aims to decode secret information and feed spurious data to the legitimate receiver, respectively. Numerical simulations reveal that even when the adversary employs sophisticated state-of-the-art deep learning based attacks, the proposed transmission schemes are resistant to these attacks and reliably guarantee system security.

It is noted that the transmission signals discussed herein are discussed in terms of particular modulation schemes such as orthogonal frequency-division multiplexing (OFDM), Quadrature Phase Shift Keying (QPSK), and the like, various embodiments may also use other modulation schemes such as differential phase shift keying (DPSK), differentially encoded QPSK (DQPSK), phase-shift keying (PSK), frequency-shift keying (FSK), amplitude-shift keying (ASK), quadrature amplitude modulation (QAM) and so on.

1 INTRODUCTION

In the emerging applications of the Internet-of-Things (IoT), IoT devices such as intelligent sensors and controllers, often operating on small-capacity batteries and running applications on ultra-low-power processors, will need to be able to communicate with each other, while being connected to the cloud. In this scenario, IoT gateways serve as an essential component in bridging IoT devices and the internet, thereby enabling device-to-device or device-to-cloud communication. As the IoT gateways will need to deal with critical tasks at the edge nodes, it is essential to ensure secure communication links between the gateway and the devices against any spoofing attacks by adversarial entities. Since end-to-end encrypted sessions between the edge devices and the gateway cannot be relied upon for secure communications due to the high computational and battery burden of such cryptographic strategies, there is an urgent need to develop physical-layer focused secure communication schemes.

Directional Modulation (DM), as a promising physical-layer secure wireless communication technique, has been rapidly developed in recent years. It has the key property of transmitting digitally modulated signals whose waveforms are well preserved only along a pre-selected direction along which legitimate users are located in free space. Directional modulation (DM) based on phased array (PA) has been widely adopted for wireless PHY security. This technique preserves the standard symbol constellation for the legitimate users (LUs) along predefined directions in the free space, while intentionally scrambles the signals in all other directions. The utilization of DM for securing the IoT devices necessities the generation of high-gain beams through compact, integrated, and cost-effective antenna designs. Most common solutions to design of arrays of planar radiating elements with low or moderate directivity typically involve patch antennas, singularly activated or arranged in series to enhance the directivity of the single element. Phased arrays, however, require the use of feeding networks to control the excitation coefficients at the input ports. Digital beam-scanning technique are nowadays well established, but they involve bulky structures to accommodate multiple transceivers. More importantly, the corresponding feeding networks may be very complex, power consuming and expensive due to the heavy use of data converters.

A solution to achieve directional beams scanning with frequency is based on metamaterial leaky-wave antennas (MTM-LWAs). These 1-D antennas enable the radiation of a high-gain fan beam leveraging on the excitation of an aperture field having exponential decay along one longitudinal direction. Furthermore, linear arrays of leaky-wave antennas (LWA) also have been put forth as an alternative to conventional two-dimensional (2-D) phased arrays, due to the possibility of obtaining narrow scannable beams with only a 1-D set of phase shifters, thereby reducing drastically the complexity and cost of the feeding network. In such structures, the radiated beam may be scanned both in elevation, by acting on the operating frequency as is typical in leaky-wave radiators, and also in azimuth, by acting on the phase shift between adjacent elements. The main beam direction is determined both by the value of the phase constant of the leaky mode excited along the array and by the imposed phase shift. This LWA solution is considerably low cost with respect to conventional 2-D phased arrays and can substantially reduce the design complexity and fabrication, as well as the losses introduced by the feeding networks of the active sources of the array.

Various embodiments comprise a novel secure architectures to fulfill the DM functionalities through utilization of MTM-LWAs for both 1-D and 2-D spaces. As orthogonal frequency-division multiplexing (OFDM), or its variations like non-contiguous (NC) OFDM, have been widely adopted in the modern wireless communication systems, especially IoT standards, various embodiments exploit the property of time-modulated arrays (TMAs) to construct OFDM/NC-OFDM DM transmitters. In TMA technique, time is used as a new degree of freedom for the array design where connecting and disconnecting the antenna elements from the feeding network in time domain would further manipulate the radiation pattern. To exploit the aforementioned benefits of the LWAs over the conventional phased arrays, various embodiments provide secure configurations are based on the idea of time modulated MTM-LWAs which incorporate time-domain switches between the MTM unit cells. Furthermore, to enable beam scanning of LWAs at a fixed frequency the various embodiments make use of tunable unit cells where a controllable inner state (On/Off) is associated with each cell. The inventors investigated the resilience of the proposed transmission architectures against passive and active adversary that either wishes to decode secret information bits or spoof a legitimate transmitter by feeding spurious data to the receiver. It is assumed that deep learning tools are used by the adversary for conducting PHY spoofing in order to evaluate the system security against state-of-the-art powerful attacks. Numerical results demonstrate that various embodiments provide physical layer security by exploiting the unique advantages of the MTM-LWA and DM.

The following portions of the specification are organized as follows. The system model is described in Section 2 along with the adversary model describing the state-of-the-art deep learning tools for PHY spoofing attack. The principles of the MTM-LWAs are presented in Section 3. Secure configurations are proposed in Section 4. Numerical results are presented in Section 5, and a conclusion is presented in Section 6.

2 SYSTEM MODEL

Figure 1B:
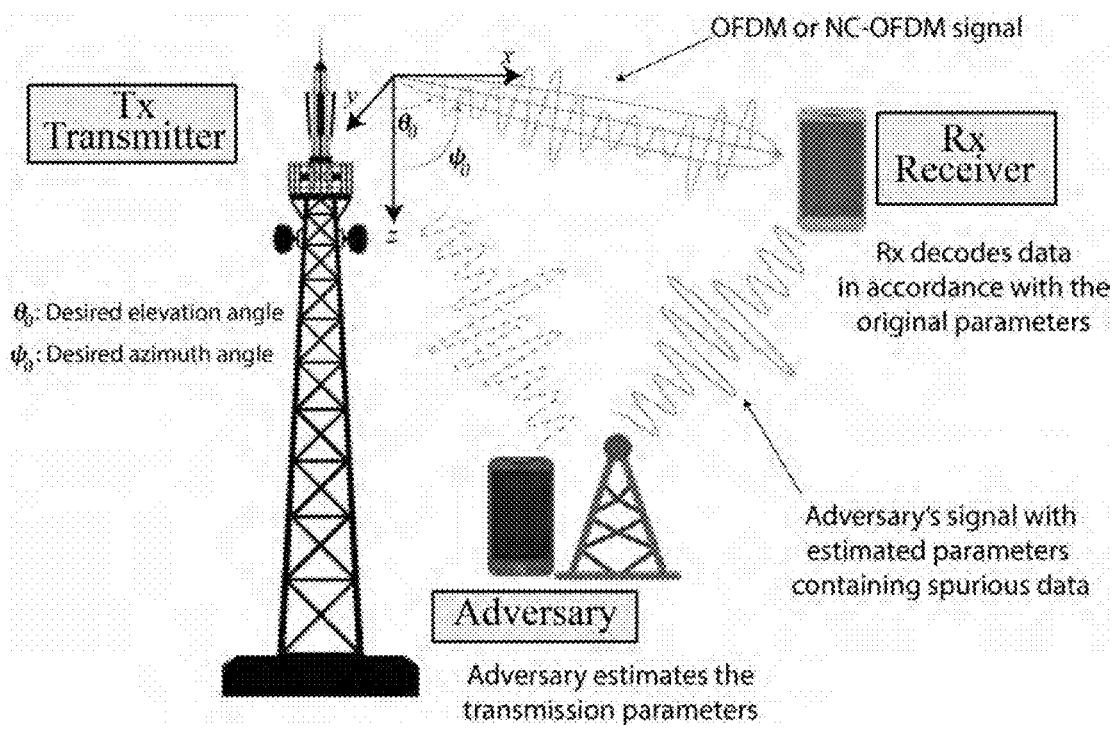

FIGS. 1A-1B graphically illustrate passive and active adversarial actions against transmission of a signal. Specifically, FIGS. 1A-1B depict a system composed of a transmitter (Tx), a receiver (Rx) and potential active/passive adversary. It is noted that the Rx, unlike the adversary, is located in a certain $\theta$ and $\psi$ angles with respect to the Tx. In a first (passive) scenario as depicted in FIG. 1A, the goal of the adversary is to decode secret data that is being transmitted by the Tx to the Rx (i.e., passive eavesdropping). In a second (active) scenario as depicted in FIG. 1B, the goal of the adversary is to devise a PHY spoofing attack, assuming the angles corresponding to the Rx's location are known by the Tx at the time of transmission.

For passive attacks such shown in FIG. 1A, the adversary is merely listening to the ongoing transmission with the aim of inferring secret messages without any form of communication with the legitimate parties. For the PHY spoofing attacks of FIG. 1B, the adversary overhears the signals sent by the Tx to the Rx, and its goal is to send spurious data to the Rx using signals that have similar PHY characteristics to the ones sent by the Tx as shown in FIG. 1B. When the spoofing detection algorithms based on channel frequency response fail, the Rx cannot distinguish the source of the original and the spurious data anymore, and by decoding the latter, the underlying system security might be compromised. In practical systems, a passive eavesdropper can steal sensitive information while active attacks could compromise patients' medical devices or autonomous vehicles, which may not only cause economic losses to individuals but also threaten peoples' lives.

The communication link between the Tx and Rx is assumed to operate over a total bandwidth B composed of a set of K subcarriers. The transmitter can either transmit over the whole band in the case of OFDM signals, or a subset of subcarriers (known as active subcarriers) in the case of NC-OFDM transmissions. OFDM/NC-OFDM signals corresponding to one symbol duration may be written as:

$$S(t) = \sum_{k=1}^{K} v(k) s_k p_k e^{j2\pi f_k t}, \quad (1)$$

where $s_k \in \mathbb{C}$ and $p_k \in \mathbb{R}$ are the complex modulated symbol and a power factor applied upon the kth subcarrier, respectively.

The total duration of one NC-OFDM/OFDM symbol is given by $T_o=T_s+T_{cp}$, with $T_s$ and $T_{cp}$ being the NC-OFDM symbol duration and the duration of the cyclic prefix, respectively. Furthermore, v is called subcarrier occupancy pattern, which is a binary vector of size K whose ith element is zero when the ith subcarrier is inactive, and it is one when the subcarrier is active. Particularly, for an OFDM transmission v amounts to an all-one vector of size N. The center frequency of each subcarrier is denoted by $f_k=f_0+k\Delta f$ where $f_0$ is the carrier frequency and $\Delta f=1/T_s$ represents the width of each subcarrier.

The actual signal radiated to the wireless medium depends on the specific antenna architecture that is utilized by the Tx. Denoting the radiated OFDM/NC-OFDM signal by R(t), the received signal by a party is given by the convolution y(t)=R(t)*h(t)+n(t), where n(t) is additive white Gaussian noise, and h(t) is the corresponding channel impulse response (CTR) between the two parties. The discrete received samples are given by $y(t_i)$, where $i=0, \ldots, n_1-1$ and $n_1$ represents the number of (complex) samples. It is assumed that noise samples at different time instances $t_i$'s are independent and identically distributed (i.i.d.) with zero mean and variance $N_0/2$. Denoting $R=[R(t_0), \ldots, R(t_{n_1-1})]$, signal power is computed by $E_R=\|\cdot\|^2/n$ where $\|\cdot\|$ is the $l_2$-norm. Then, SNR and SNR per bit equal to $$E_R/N_0 \text{ and } E_b/N_0 = \frac{E_R}{QN_0},$$

respectively. One can verify that Q equals $N_a b/N$ where $N_a$ denotes the number of active subcarriers, and b is the number of bits sent over each subcarrier.

The actual signal radiated to the wireless medium depends on the specific antenna architecture that is utilized by the Tx. Denoting the radiated OFDM/NC-OFDM signal by R(t), the received signal by a party is given by the convolution y(t)=R(t)*h(t)+n(t), where n(t) is additive white Gaussian noise, and h(t) is the corresponding channel impulse response (CTR) between the two parties. The discrete received samples are given by $y(t_i)$, where $i=0, \ldots, n_1-1$ and $n_1$ represents the number of (complex) samples. Assume noise samples at different time instances $t_i$'s are independent and identically distributed (i.i.d.) with zero mean and variance $N_0/2$. Denoting $R=[R(t_0), \ldots, R(t_{n_1-1})]$, signal power is computed by $E_R=\|R\|^2/n$ where $\|\cdot\|$ is the $l_2$-norm. Then, SNR and SNR per bit equal to $$E_R/N_0 \text{ and } E_b/N_0 = \frac{E_R}{QN_0},$$

respectively, assuming $$Q \stackrel{def}{=} \frac{N_a b}{N}$$

where $N_a$ denotes the number of active subcarriers, and b is the number of bits sent over each subcarrier.

To analyze the best performance achievable by a passive adversary, assume the Tx is utilizing OFDM transmission and the decoding is done with perfect synchronization assumption through the Inverse Fast Fourier Transform (IFFT) process. However, it is noted that OFDM signals are inherently susceptible to PHY spoofing attacks as the corresponding transmission parameters may be inferred with no ambiguity by cyclostationary analysis. Therefore, in order to investigate the performance of the PHY spoofing attacks, assume the Tx employs NC-OFDM signals which are known for their low probability of exploitation characteristics and enhanced security in comparison to an OFDM-based transmission. Specifically, the Tx chooses the parameters $\Delta f$, u and N and transmits NC-OFDM signals. The positions of active subcarriers in u are chosen in a random fashion for each NC-OFDM symbol. The adversary seeks to find these transmission parameters in order to generate waveforms similar to (1), inject spurious data in place of $s_n$, and transmit them to the receiver. Assume the Rx only decodes data that are being sent over the active subcarriers with the correct $\Delta f$ and N chosen by Tx; otherwise, a decoding failure will occur. Therefore, utilize bit error rate (BER) at Rx as a measure to evaluate the performance of the adversary in terms of spoofing. If this BER is close to that of the baseline transmission (where the parameters are perfectly known at the Rx), it is indicative of the maximum spoofing performance of the adversary. At the other extreme, a BER close to 0.5 suggests that the adversary cannot do much in terms of spoofing (i.e., Tx-Rx transmission is secured against PHY spoofing). It is noted that the subcarrier allocation pattern is assumed to be known at the Rx in a similar setting to a code division multiple access (CDMA) system where different users share spreading codes (a binary sequence) with a base station (BS) which are assumed to be known by the BS as part of the multiuser detection process.

Regarding the model for the active attacks, it is noted that the adversary has access to radio equipment for overhearing the transmissions between two legitimate parties. Furthermore, it is assumed that the adversary is aware of the antenna architecture used by the Tx and is able to generate NC-OFDM signals with the estimated parameters and transmitting them to the Rx. Also considered is a setting where the adversary has resources for data processing via deep learning algorithms. Adversary can sample the received signals, and build up a dataset out of these samples where each data entry corresponds to an NC-OFDM signal. The data samples may or may not be associated with the corresponding true transmission parameters, i.e., $\Delta f$, N and v, referred to as labels. Depending on the availability of the labels during the training stage, two types of deep learning algorithms are useful: supervised and unsupervised. The former makes use of the labels for training the DNNs while the latter exploits possible data structure and clustering methods without using labels. Also considered are the state-of-the-art algorithms proposed in for PHY spoofing where feed-forward fully connected deep neural networks are utilized for the supervised scenario while the unsupervised attack relies on variational auto-encoders (VAEs).

3 METAMATERIAL LWA

An MTM leaky-wave antenna may be realized by a cascade of composite right/left-handed (CRLH) unit cells, which has recently been utilized in various scenarios, such as radar sensing, 2D beamforming, and active antennas.

Figure 2B:
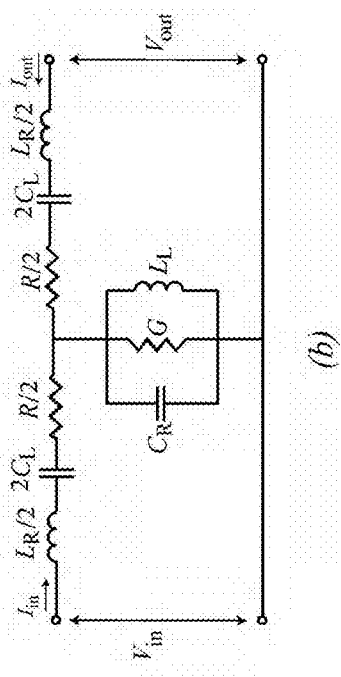
FIG. 2B depicts an equivalent circuit model of a unit-cell in the CRLH LWA of FIG. 2A.
Figure 2A:
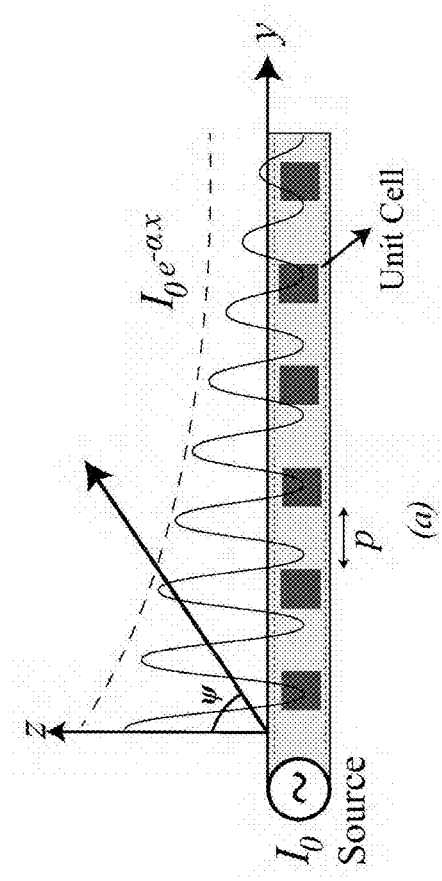
FIG. 2A depicts an embodiment of a periodic-structure CRLH LWA.

FIG. 2A depicts an embodiment of a periodic-structure CRLH LWA, with period p. Specifically, a schematic of a LWA is depicted in FIG. 2A with N=6 unit cells, where p is the length of each unit cell. The total radiated pattern to the 1D space is then approximated by the array factor function as $$S(\psi) = \sum_{n=1}^{N} I_0 e^{-\alpha(n-1)p} e^{j(n-1)k_0 p \sin\psi + j\zeta_n}, \quad (2)$$

where the phase function equals $$\zeta_n = -(n-1)k_0 p \sin\psi_0, \quad (3)$$

$\alpha$ denotes the leakage factor, $I_0$ represents the input signal, and $$k_0 = \frac{2\pi}{\lambda}$$

is the wave number. For MTM-based LWA, the beam steering angle $\psi_0$ is a function of the input frequency and is expressed by $$\psi_0 = \sin^{-1}\left(\frac{\beta(w)}{k_0}\right), \quad (4)$$

where $\beta(w)$ is the phase constant and $\omega$ is the angular frequency. For the CRLH LWAs, $\beta(w)$ is determined by the equivalent circuit model for each unit cell.

FIG. 2B depicts an equivalent circuit model of a unit-cell in the CRLH LWA of FIG. 2A. In various embodiments, the circuit depicted in FIG. 2B is used for all the unit cells, which makes it possible to obtain the directivity of a LWA of arbitrary length (N) by analyzing only one unit cell. For this case, the phase constant may be obtained via $$j\beta p = \text{Im} \sqrt{\left(R + jwL_R + \frac{1}{jwC_L}\right)\left(G + jwC_R + \frac{1}{jwL_L}\right)}. \quad (5)$$

It should be noted that the beam scanning angle defined in (4) only corresponds to the conventional beam scanning array with uniform cells where the phase constant remains the same across the array. In nonuniform cases, each MTM cell may have different phase constants depending on the internal mode as will be discussed in the next section.

3.1 LWA Antenna Beam Scanning at a Fixed Frequency

As the frequency-dependent beam scanning feature of the LWAs may be a limiting factor in certain applications, novel LWA designs have been proposed in the literature in order to enable beam scanning at a fixed frequency. In particular, various embodiments may use a digitally modulated array factor (DMAF) method for the MTM array in which each unit cell is associated with an ON/OFF state. This is made feasible by considering a two symmetrical J-shaped patterns for each unit cell whose equivalent circuit model contains an extra element compared to FIG. 2A/2B, called capacitance $C_g$, that is produced between the patch near the inductance chip and the RF ground. Furthermore, a pair of surface-mounted p-i-n diodes are applied for electrically opening (mode 0) or shorting (mode 1) the slots in each J-shaped pattern, which result in tuning the capacitance $C_g$. The equivalent phase constant $\beta$ for this configuration is computed as:

$$\beta p = \text{Im}\left\{ \sqrt{jwL_R \frac{w^2 - w_{se}^2}{w^2} \cdot jwC_R \frac{w^2 - w_{sh}^2}{w^2 - \frac{1}{L_L C_g}}} \right\} \quad (6)$$

where p is length of one unit cell, and $w_{sh}$ and $w_{se}$ are given by $$w_{se} = \frac{1}{\sqrt{L_R C_L}}, \quad w_{sh} = \sqrt{\frac{1}{L_L C_g} + \frac{1}{L_L C_R}}. \quad (7)$$

Figure 5:
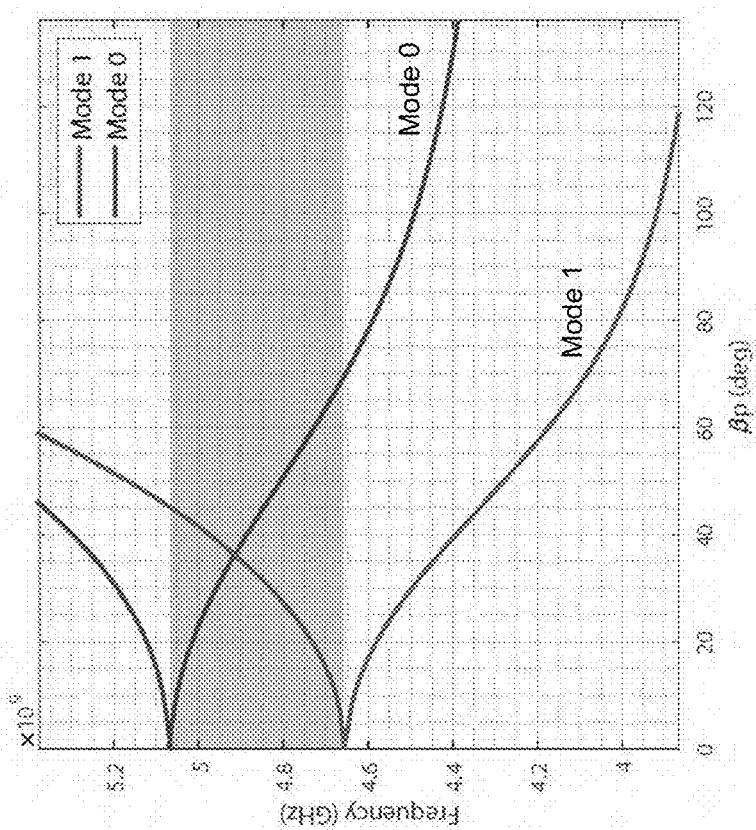
FIG. 5 graphically illustrates dispersion curves of a tunable unit cell with two different modes.

It is noted that tuning the capacitance $C_g$ through the p-i-n diodes associated with each unit cell could result in two different phase constants with opposite signs in a fixed frequency. FIG. 5 graphically illustrates dispersion curves of a tunable unit cell with two different modes, wherein the relevant circuit parameters are $C_R$=0.82 pF, $L_R$=3.45 nH, $C_L$=0.78 pF, $L_L$=4.38 nH. In fact, opening and shorting p-i-n diodes in the unit is equivalent to moving the dispersion curves up and down. Specifically, in the overlap frequency band which is highlighted in FIG. 5, a unit cell can have both negative and positive $\beta$ base on the underlying mode. When diodes are turned off (mode 0), the phase constant is negative, and it is positive when they are on (mode 1), respectively.

Figure 3:
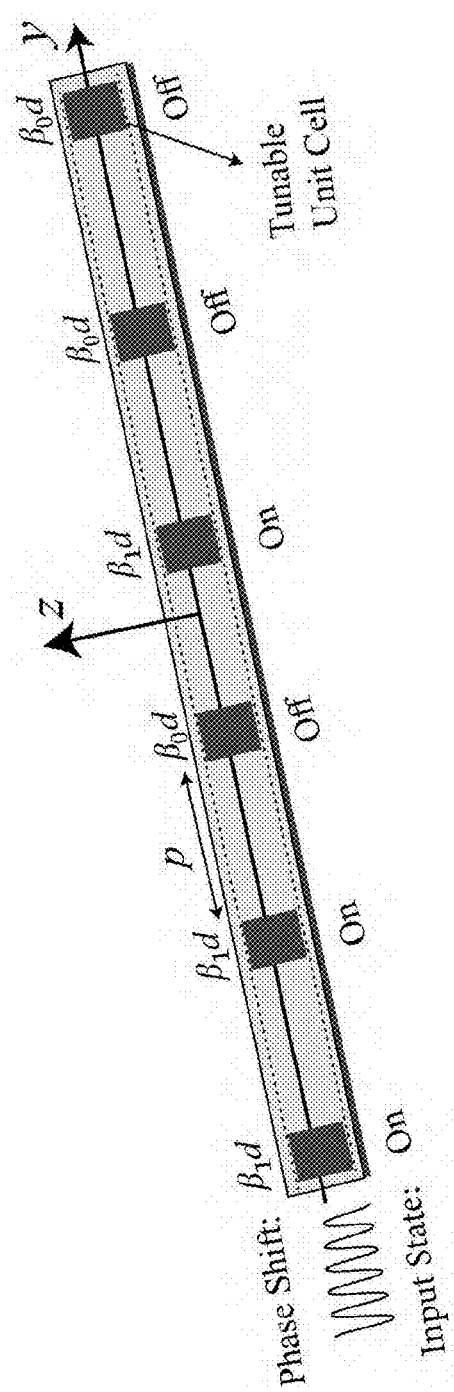
FIG. 3 depicts a schematic diagram of exemplary LWAs with tunable unit cells.

FIG. 3 depicts a schematic diagram of exemplary LWAs with tunable unit cells. Since the unit cells can have two different phase constants in this configuration, a phase delay equation may be provided as follows $$\zeta_n = -\sum_{m=1}^{n} \phi(m), \quad (8)$$

where the phase-delay of the ith unit cell, normalized by its length, is denoted by $$\phi(m) = \begin{cases} \beta_0 p & \text{if } mth \text{ unit cell is in mode 0,} \\ \beta_1 p & \text{if } mth \text{ unit cell is in mode 1.} \end{cases} \quad (9)$$

Consequently, the final radiation pattern for this tunable MTM configuration may be obtained by plugging (8) in (2), and expressed as $$S(\psi) = \sum_{n=1}^{N} I_0 e^{-\alpha(n-1)p} e^{j(n-1)k_0 p \sin\psi - j\sum_{m=1}^{n}\phi(m)}. \quad (10)$$

Figure 4:
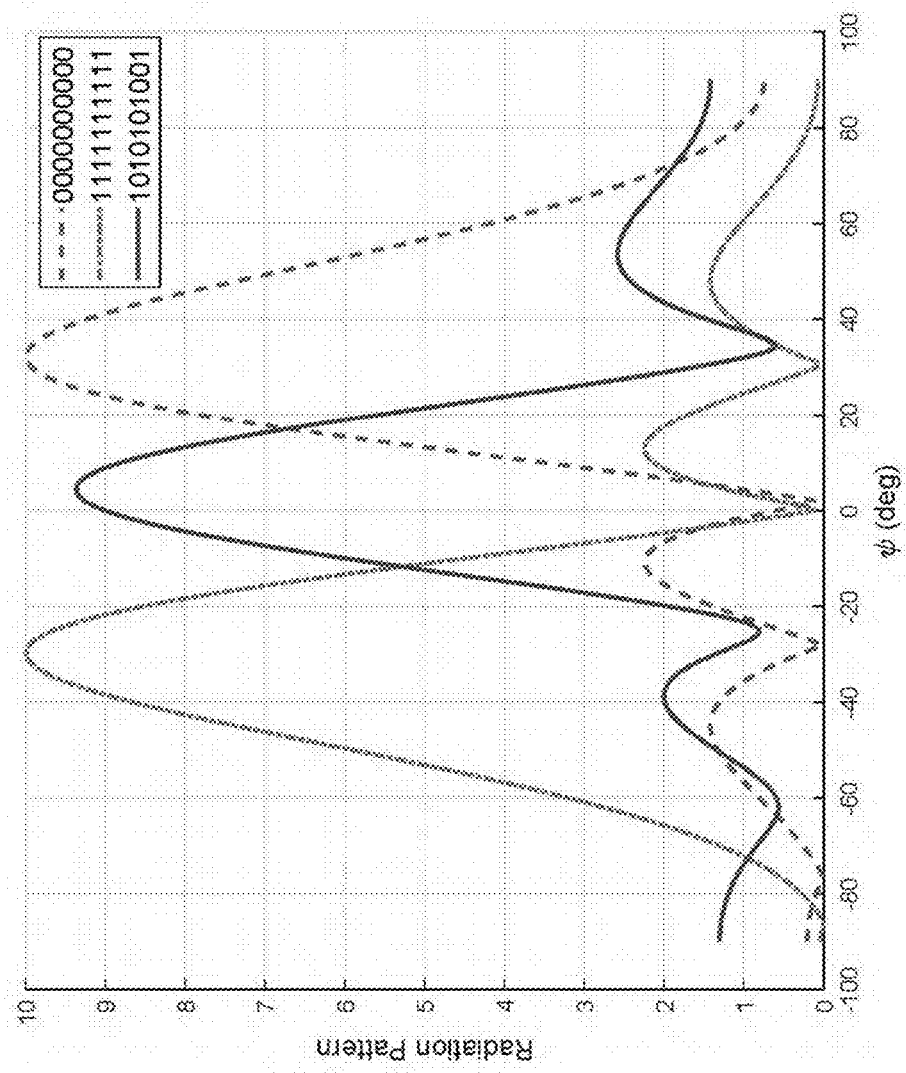
FIG. 4 graphically depicts a simulated radiation pattern for a LWA with tunable unit cells for a fixed frequency of f=4.9 GHz.

FIG. 4 graphically depicts a simulated radiation pattern based on (10) for a LWA with tunable unit cells for a fixed frequency of f=4.9 GHz. Specifically, FIG. 4 graphically illustrates three different examples of a radiation pattern based on (10) for a frequency of 4.9 GHz. From the dispersion curves in FIG. 5, it may be deduced that $\beta_1 p$=35.6° and $\beta_0 p$=−38.21° for each unit cell. For this discussion, consider a number of unit cells to be N=10 and the underlying working modes are denoted by a binary sequence of length 10 which is used to label the corresponding curves in FIG. 4. It is shown that continuous beam scanning between −30° and 30° at a fixed frequency is feasible through LWAs through tunable unit cells.

4 PROPOSED CONFIGURATIONS

In this section, embodiments are provided of transmitter architectures enabled by MTM LWAs which make secure transmission to a legitimate receiver feasible through generating highly directive beams. To this end, tunable unit cells introduced in Section 3.1 are utilized which enables the beam steering capability of the LWAs at a fixed frequency. Start with the 1D case and further extend the idea to 2D setting.

4.1 Time-Modulated CRLH LWA

Figure 6:
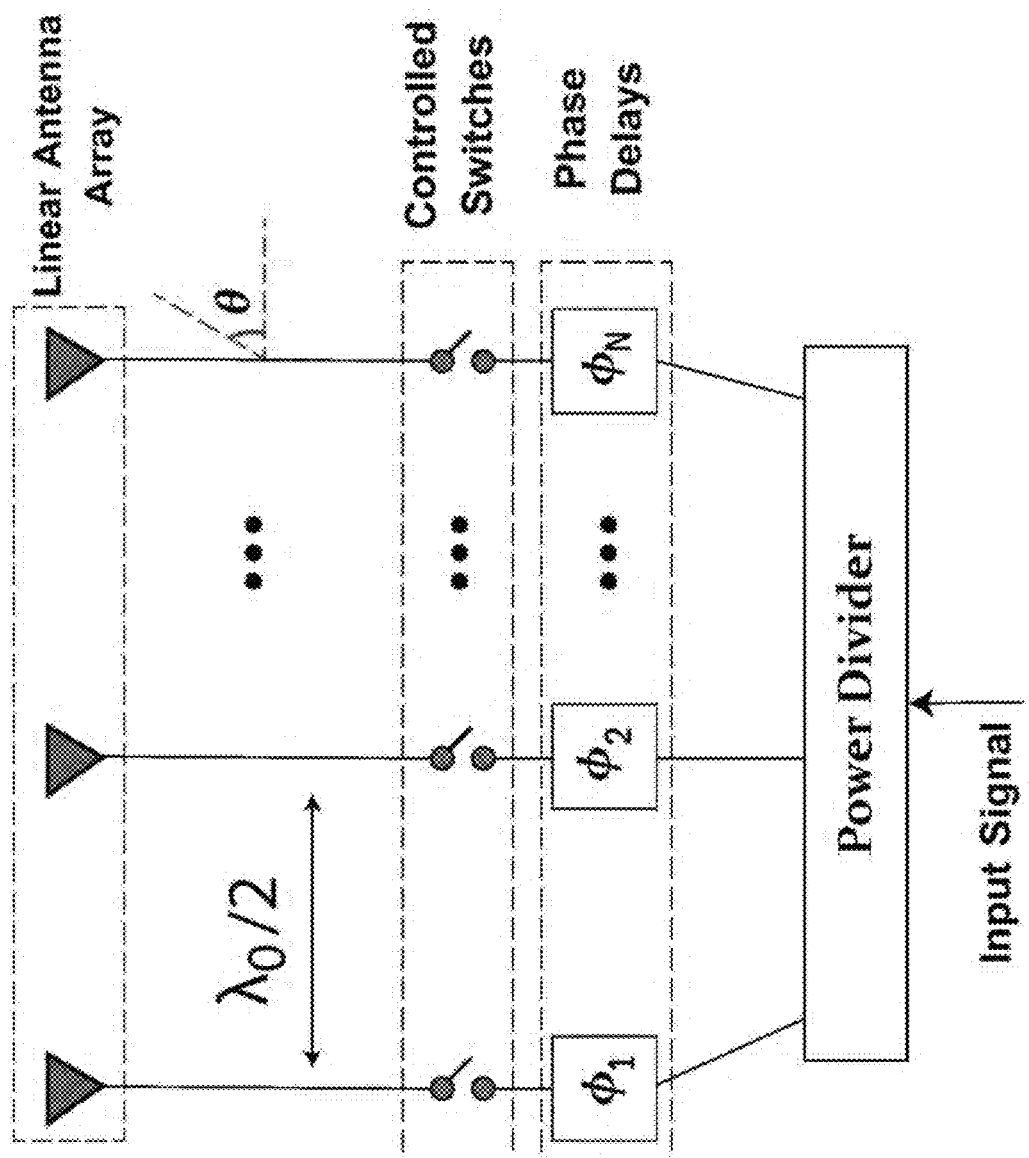
FIG. 6 schematically depicts a TMA system consisting of an N-element linear antenna array.

The first secure architecture proposed is time-modulated LWAs. Time-modulation arrays (TMAs) are phase arrays consisting of linear antenna elements whose radiated power patterns are controlled by periodically enabling and disabling the excitation corresponding to each individual array element. A standard TMA system consisting of an N-element linear antenna array is illustrated in FIG. 6. For the case that the elements are uniformly half-wavelength ($\lambda/2$) spaced, the radiated signal from this phased TMA may be expressed as $$R(\theta, t) = \sum_{n=1}^{N} \frac{1}{\sqrt{N}} S(t) U_n(t) e^{j(n-1)\pi(\cos\theta - \cos\theta_0)}, \quad (11)$$

where $\theta \in [0,\pi]$ The various embodiments contemplate a design of the time-domain switches $U_n(t)$ aiming at achieving two important goals; namely, (1) Preservation of the original transmitted signal waveform along the desire spatial direction, and (2) Distortion of the transmitted signal waveform along the undesired directions. To this end, as the nth switch, a rectangular pulse starting at time $t_n^s$ and ending at $t_n^e$ is employed which is defined by $$U_n(t) = \begin{cases} 1 & \text{if } t_n^s \le t \le t_n^e, \\ 0 & \text{otherwise}, \end{cases} \text{ and } U_n(t) = \begin{cases} 1 & \text{if } 0 \le t \le t_n^e, \\ 1 & \text{if } t_n^s \le t \le T_p, \\ 0 & \text{otherwise}, \end{cases} \quad (12)$$

for the cases $t_n^e > t_n^s$ and $t_n^e < t_n^s$, respectively, where the $$T_p = \frac{1}{f_p}$$

denotes the repetition time period of the switch waveform.

The on-time period for the nth switch is always less than $T_p$ and equals to $\Delta t_n = t_n^e - t_n^s$ when $t_n^e > t_n^s$, or $\Delta t_n = T_p + t_n^e - t_n^s$ when $t_n^e < t_n^s$. Through Fourier series analysis, it is shown that choosing unique starting times while having identical on-time periods, denoted by $\Delta t$, for all the switches leads to the fulfillment of the two goals along $\theta_0$, given the following is satisfied:

$$\frac{t_n^s}{T_p} \in \left\{ \frac{i-1}{N} \mid i = 1, 2, \ldots, N \right\}, \quad (13)$$

$$\frac{\Delta t_n}{T_p} \in \left\{ \frac{i-1}{N} \mid i = 1, 2, \ldots, N \right\}. \quad (14)$$

By comparing the radiated signal formula for LWAs in (2) or (10) with that of the above phased array (11), it follows that time-modulated idea may be realized through MTM LWAs as well if one is able to control (On/Off) the input signal to each unit cell. Towards this goal, one may naively place a switch between the unit cells in the leaky guiding structure which could either incite or suppress the subsequent unit cell. However, under this architecture, if a switch located before a unit cell is off, the input signal can not reach to the subsequent units.

Figure 7:
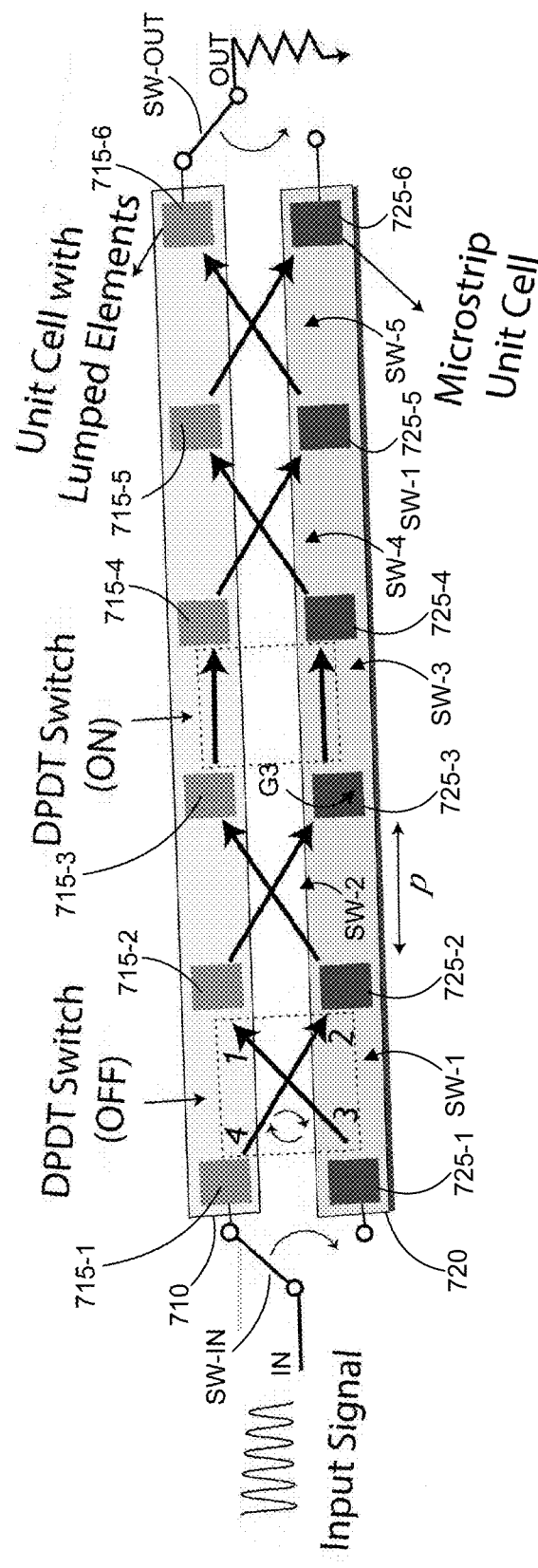
FIG. 7 depicts an embodiment of a time modulated CRLH LWA.

FIG. 7 depicts an embodiment of a time modulated composite right/left-handed (CRLH) leaky-wave antenna (LWA).

The time-modulated CRLH LWA 700 of FIG. 7 comprises a first transmission line 710 having, illustratively, six lumped element unit cells 715-1 through 715-6 (collectively unit cells 715) and a second transmission line 720 having, illustratively, six microstrip unit cells 725-1 through 725-6 (collectively unit cells 725). Each of unit cells 715/725 of a transmission line 710/720 is separated from an adjacent unit cell 715/725 of that transmission line 710/720 by a distance p.

The second transmission line 720 comprises a microstrip unit cell transmission line configured to propagate a wave therethrough to provide an output signal to be radiated into free space, whereas the first transmission line 720 comprises a lumped elements unit cell transmission line configured to provide a desired or required phase for the wave propagated through and out of the second transmission line 720. That is, the second transmission line 720 behaves like an antenna, whereas the first transmission line 720 is used to provide the required phase change for the propagated/transmitted wave of the second transmission line 720. The required phase change is the phase change necessary to direct the free space radiated signal in the manner discussed herein with respect to the various figures.

Referring to FIG. 7, an input signal IN is received at an input switch SW-IN and controllably coupled thereby to an input of either one of the first unit cells 715-1/725-1 of the transmission lines 710/720.

A first double-poll double-throw (DPDT) switch SW-1 disposed between the first 710 and second 720 transmission lines controllably couples output signals of the first unit cells 715-1/725-1 to respective inputs of the next unit cell in the same respective transmission line (i.e., output 715-1 to input 715-2, and output 715-2 to input 725-2), or the next unit cell in the other transmission line (i.e., output 715-1 to input 725-2, and output 725-1 to input 715-2).

A second DPDT switch SW-2 disposed between the first 710 and second 720 transmission lines controllably couples output signals of the second unit cells 715-2/725-2 to inputs of the third unit cells (715-3/725-3 or 725-3/715-3).

A third DPDT switch SW-3 disposed between the first 710 and second 720 transmission lines controllably couples output signals of the third unit cells 715-3/725-3 to inputs of the fourth unit cells (715-4/725-4 or 725-4/715-4).

A fourth DPDT switch SW-4 disposed between the first 710 and second 720 transmission lines controllably couples output signals of the third unit cells 715-3/725-3 to inputs of the fourth unit cells (715-4/725-4 or 725-4/715-4).

A fifth DPDT switch SW-5 disposed between the first 710 and second 720 transmission lines controllably couples output signals of the fourth unit cells 715-4/725-4 to inputs of the fifth unit cells (715-5/725-5 or 725-5/715-5).

An output switch SW-OUT controllably couples an output signal from either one of the sixth unit cells 715-6/725-1 to provide thereby an output signal OUT.

The time-modulated CRLH LWA 700 of FIG. 7 provides an apparatus in which each CRLH unit cell with microstrip implementation there exists its equivalent circuit model realized with lumped elements. Furthermore, Double-Pole-Double-Throw (DPDT) RF switches (SW-1 to SW-5) are employed between each pair of the unit cells 715/725. In this way, depending on the logic voltage level applied to the switches, the port 1 and port 2 pins connect to one of the two other port pins (port 3 or port 4) through a low insertion loss path, while maintaining a high isolation path to the alternate port. If the switches located before a unit cell are off, the input signal can still reach the switch located before this unit cell, through the other pass created by the lumped realization of the CRLH unit cells. For this configuration, the radiated signal may be expressed by $$R(\psi, t) = \sum_{n'=1}^{N'} S(t) e^{-\alpha(n'-1)p} U'_{n'}(t) e^{j(n'-1)k_0 p \sin \psi - j\sum_{l=1}^{n'} \beta_l p} \quad (15)$$

where N' denotes the number of microstrip unit cells.

It is noted that for a typical LWA the values of αp are pretty small (e.g., a typical value of a may be as a constant at the average value of 0.02 while p may be in the order of a centimeter or 0.01), and the exponential term ($e^{-\alpha(n'-1)p}$) may be approximated by one. The inventors therefor concluded that the choice of the switches in (13) would result in time-modulated LWAs. For simplicity of discussion, the various embodiments will be described within the context of time-modulated LWAs that only have one unit cell on at a time. Then, the DM functionality goals may be achieved if the switch parameters are chosen as $$\frac{t_n^s}{T_p} \in \left\{ \frac{i-1}{N} | i = 1, 2, \ldots, N \right\}, \quad (16)$$

$$\frac{\Delta t_n}{T_p} = \frac{1}{N}, \forall n. \quad (17)$$

Generally speaking, the transmitter of FIG. 7 comprises first and second leaky-wave antennas (LWAs), each LWA comprising a predefined number of microstrip unit cells separated from each other by a distance p, each first LWA microstrip unit cell cooperating with a corresponding second LWA microstrip unit cell to form thereby a respective unit cell stage having two inputs and two outputs; an input switch, for alternatively coupling an input signal for transmission to unit cell inputs of a first unit cell stage; a plurality of DPDT switches, each DPDT switch disposed between respective prior and subsequent unit cell stages, each DPDT switch alternately coupling prior unit cell stage output signals to subsequent unit cell stage unit cell inputs; and an output switch, for alternatively coupling final unit cell stage output signals to an output to provide thereby an transmission signal; wherein the DPDT switches are controlled in a manner causing directional modulation of the transmission signal such that the transmission signal exhibits a low bit error rate (BER) to a receiver at a desired location.

4.2 Time-Modulated Parallel Feeding with Plain CRLH LWA

For this architecture, a standard TMA system consisting of an N-element linear antenna array is considered where two consecutive antenna elements are placed a certain distance d apart, and have identical isotropic active element patterns. It is proposed to equip each branch with a CRLH LWA which would enable radiation in a 2D space. The input signal is split into N copies with identical power, phase-delayed and then goes through a time-domain On-Off RF switch $U_n(t)$. These switches are designed to enable the DM functionality for the transmission through the antenna array. However, before reaching to the end of branch the time-domain manipulated signal is fed to a CRLH LWA in each branch with N' unit cells spaced p apart.

Figure 8:
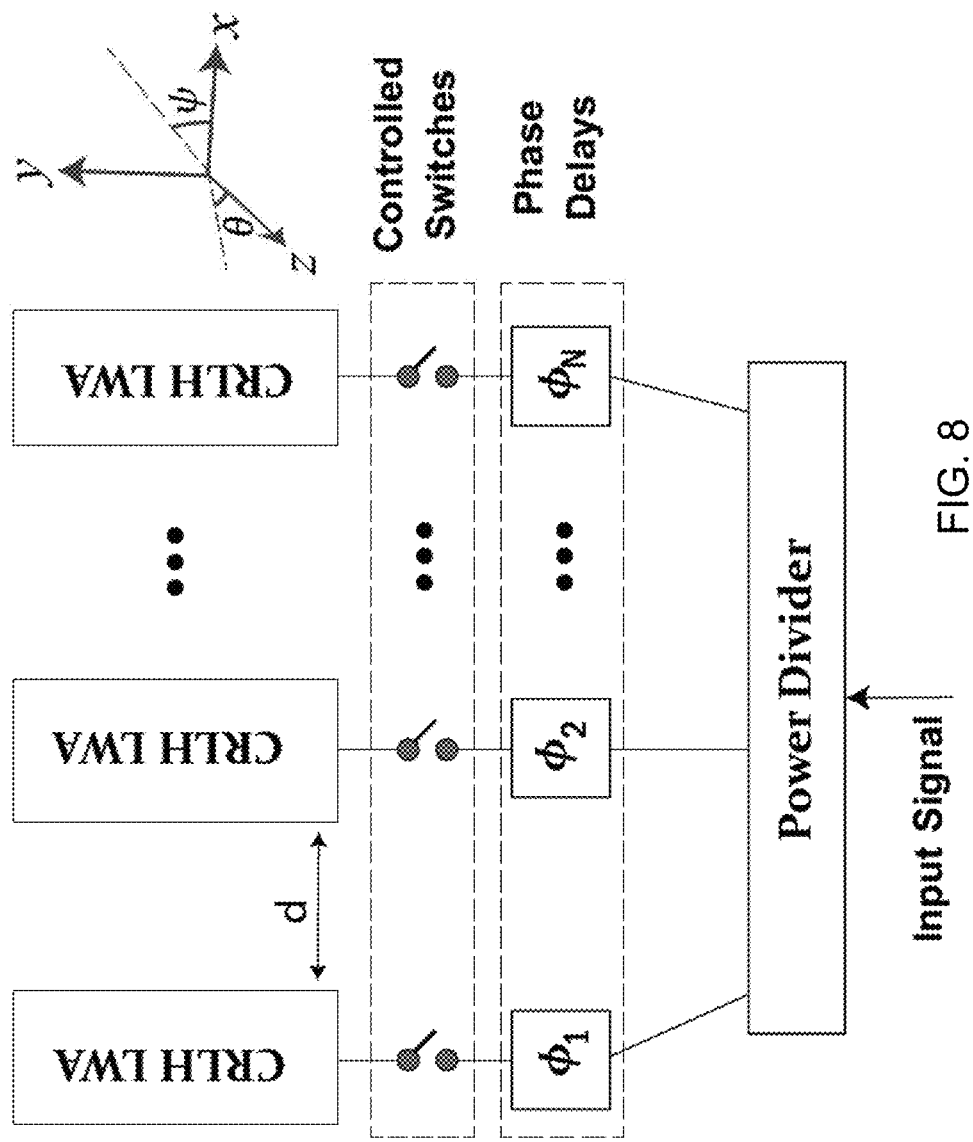
FIG. 8 schematically depicts a TMA system consisting of an N-element linear antenna array with plain CRLH LWA.

A schematic of this configuration is presented in FIG. 8, which depicts a plurality (e.g., N) of the CRLH LWAs of FIG. 7, where each of the plurality of CRLH LWAs is separated from an adjacent CRLH LWA by a distance d, and where each the CRLH LWA receives a controlled switch a respective phase delayed version of a common input signal. The respective phase delayed versions of the common input signal may be produced by a power divider configured to divide an input signal into a plurality of common input signals, each of which is coupled to a respective phase delay module (e.g., N phase delay modules, or N−1 phase delay modules if one common input signal need not be delayed), wherein each delay module delays its respective common input signal by a predefined amount (e.g., 1/N).

In fact, the LWA radiates signal through the elevation angle ψ while the antenna array's signal propagates in the azimuth direction θ. Mathematically, the radiated signal into the space for this configuration may be obtained based on the array factor approach of a 2D LWA structure and TMA principle, such as expressed as $$R(\theta, \psi, t) = \sum_{n=1}^{N} \frac{1}{\sqrt{N}} S(t) \left( \sum_{n'=1}^{N'} e^{-\alpha(n'-1)p} e^{j(n'-1)k_0 p \sin\theta \sin\psi - j\sum_{n'=1}^{N'} \beta_l p} \right) \quad (18)$$

$$U_n(t) e^{j(n-1)k_0 d (\sin\theta \cos\psi - \sin\theta_0 \cos\psi_0)},$$

where θ∈[0,π/2] and ψ∈[0,2π].

Also, the wave number is defined as $$k_0 = \frac{2\pi f_0}{c}$$

where $f_0$ and c denotes the carrier frequency of the input signal and the speed of light, respectively. The choices of switches $U_n(t)$ in (12) and (13) will realize the DM functionalities, i.e., preserving the input signal along $\theta_0$ and $\psi_0$ during transmission and distorting it along any other direction. By utilizing such switches in (18) for the desired angles $\theta_0$ and $\psi_0$, the following is provided $$R(\theta_0, \psi_0, t) = \frac{\Delta t}{T_p} \sqrt{N} \left( \sum_{n'=1}^{N'} e^{-\alpha(n'-1)p} \right) S(t), \quad (19)$$

which indicates that the original signal is preserved scaled by a gain which is a function of beamforming, switches' on-time period, and the LWA characteristics.

For the undesired spatial angles, on the other hand, the received signal is distorted in the time-domain as follows $$R(\theta, \psi, t) = \frac{1}{\sqrt{N}} S(t) \left( \sum_{n'=1}^{N'} e^{-\alpha(n'-1)p} e^{j(n'-1)k_0 p \sin\theta \sin\psi - j\sum_{n'=1}^{N'} \beta_l p} \right) \quad (20)$$

$$\sum_{m=-\infty}^{\infty} V(t, m, N, t_n^s, \Delta t_n, \theta, \psi),$$

where $$V(t, m, N, t_n^s, \Delta t_n, \theta, \psi) = \sum_{n=1}^{N} \left( \frac{\sin(m\pi f_p \Delta t_n)}{m\pi} \right) e^{j2m\pi f_p (t - t_n^s - \Delta t_n/2)} \quad (21)$$

$$e^{j(n-1)k_0 d (\sin\theta \cos\psi - \sin\theta_0 \cos\psi_0)}.$$

In fact, for this architecture the DM functionalities along the both θ and ψ angles are realized via only one set of switches denoted by $U_n(t)$.

4.3 Time-Modulated Parallel Feeding with Switch-Enabled CRLH LWA

Figure 9:
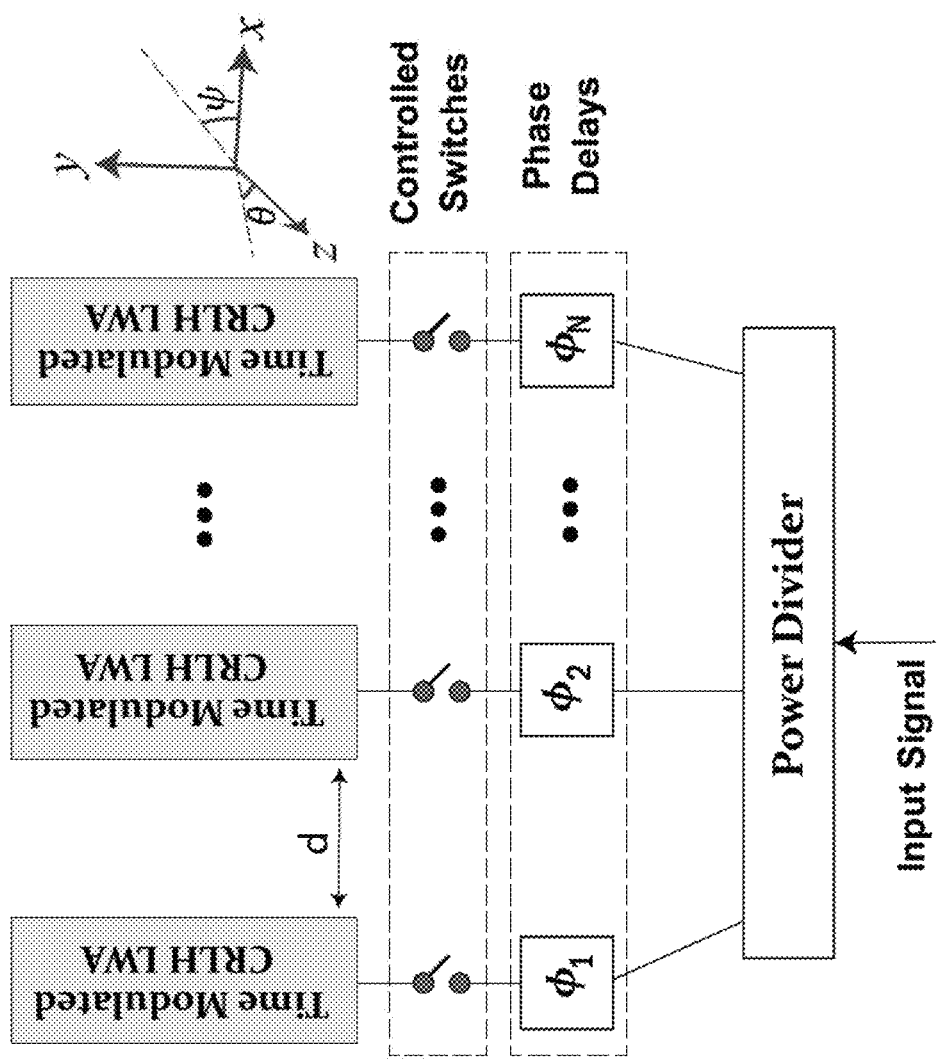
FIG. 9 schematically depicts a TMA system consisting of an N-element linear antenna array with a time-modulated CRLH LWA.
Figure 10:
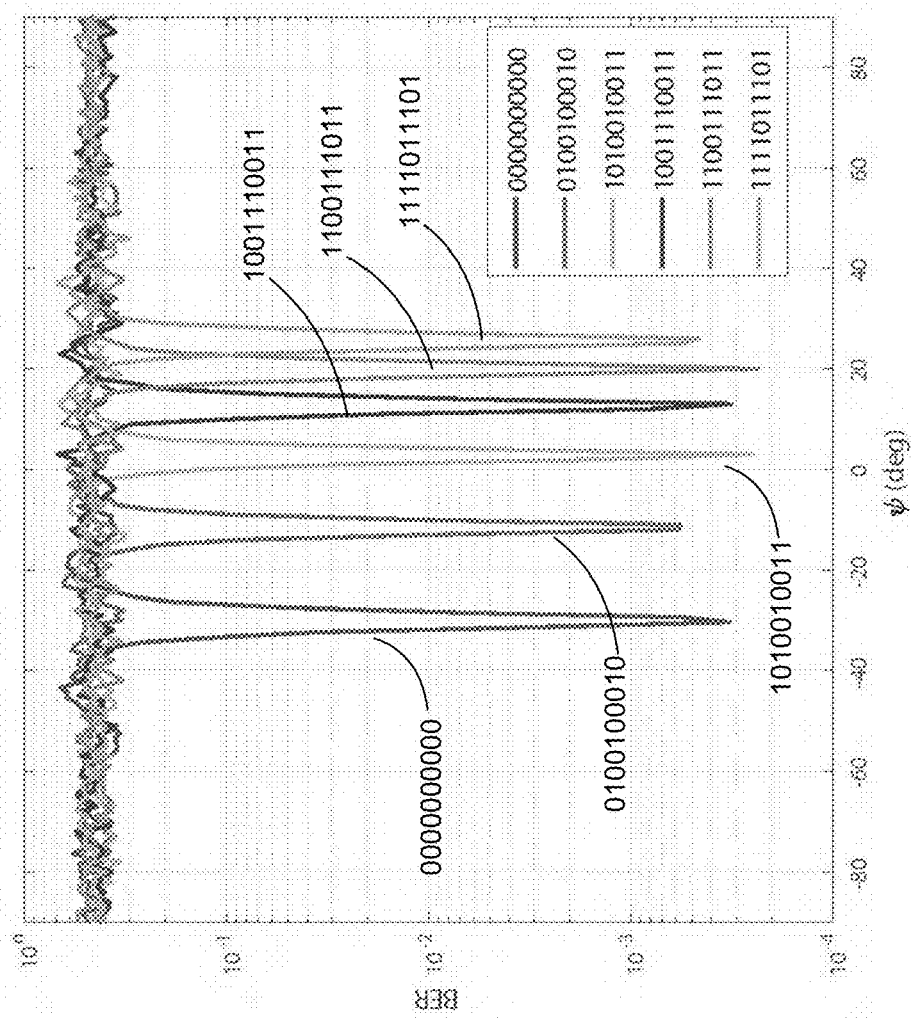
FIG. 10 graphically illustrates simulated BERs of a proposed time-modulated LWA with the corresponding input modes for the tunable unit cells.

This configuration is envisaged based on the combination of the previous two cases. Specifically, as shown in FIG. 9 the plain LWA in each branch is replaced with the time-modulated LWA introduced in Section 4.1. The radiated signal into the 2D space for this configuration may be obtained in a similar fashion to (18) as $$R(\theta, \psi, t) = \sum_{n=1}^{N} \frac{1}{\sqrt{N}} S(t) \left( \sum_{n'=1}^{N'} e^{-\alpha(n'-1)p} U'_{n'}(t) e^{j(n'-1)k_0 p \sin\theta \sin\psi - j \sum_{l=1}^{n'} \beta_l p} \right) \times \quad (22)$$
$$U_n(t) e^{j(n-1)k_0 d(\sin\theta\cos\psi - \sin\theta_0\cos\psi_0)}$$

where $\theta \in [0, \pi/2]$ and $\psi \in [0, 2\pi]$.

Similar to the previous configuration, the switches $U_n(t)$ and $U'_n(t)$ are designed based on the set of solutions in (16) and (17). As a result, for the desired angles $\theta_0$ and $\psi_0$, the received signal becomes $$R(\theta_0, \psi_0, t) = \frac{\Delta t}{T_p} S(t), \quad (23)$$

while for every other angle the received signal is distorted as $$R(\theta, \psi, t) = \frac{1}{\sqrt{N}} S(t) \sum_{m=-\infty}^{\infty} \quad (24)$$
$$V'(t, m, N', t^s_{n'}, \Delta t_{n'}, \theta, \psi) \sum_{m=-\infty}^{\infty} V(t, m, N, t^s_n, \Delta t_n, \theta, \psi),$$

where the V function is given in (21) and V' is defined by $$V'(t, m, N', t^s_{n'}, \Delta t_{n'}, \theta, \psi) = \quad (25)$$
$$\sum_{n'=1}^{N'} \left( \frac{\sin(m\pi f_p \Delta t_{n'})}{m\pi} e^{j2m\pi f_p(t - t^s_{n'} - \Delta t_{n'}/2)} \right) e^{j(n'-1)k_0 d \sin\theta\sin\psi - j\sum_{l=1}^{n'} \beta_l p}$$

For this configuration, one can verify that the DM functionalities are implemented via two set of switches corresponding to that of the phased array and that of the LWAs.

5 NUMERICAL RESULTS

In this section, numerical simulations are used to characterize the performance of the proposed secure transmission schemes in Section 4 against the passive and active PHY attacks (see Section 2). Beginning with the time-modulated CRLH LWA proposed in section 4.1 where the number of unit cells and the period is set to N'=10 and p=0.012, respectively. The input signal is considered to be an OFDM signal with K=16 subcarriers, carrier frequency $f_0$=4.9 GHz where QPSK modulation is used at each subcarrier to map the bits into complex symbols.

Figure 11B:
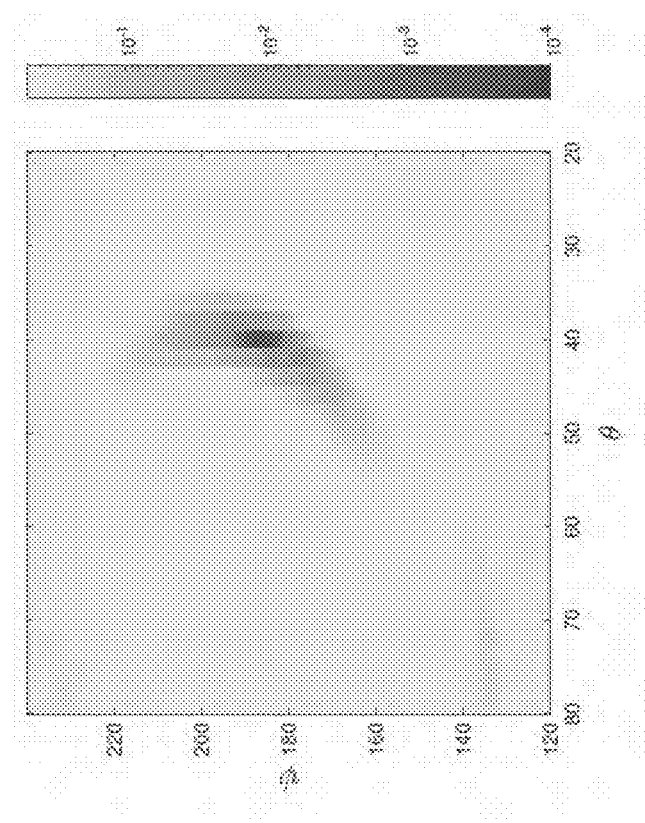
FIGS. 11A-11B graphically illustrate BER performance of a receiver in 2D space when Tx is using time-modulated parallel feeding with plain CRLH LWA for transmission, wherein N=10, N'=10.
Figure 11A:
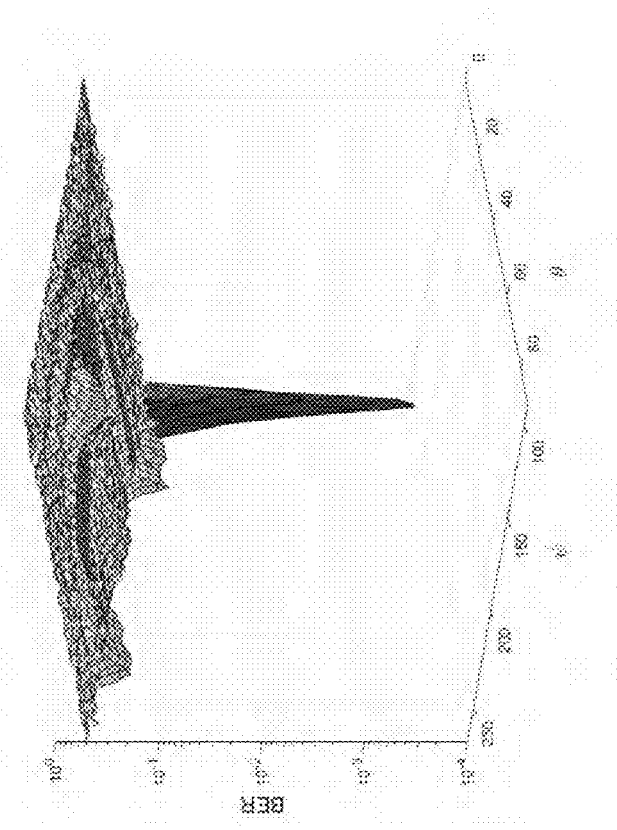

FIGS. 11A-11B graphically illustrate BER performance of a receiver in 2D space when Tx is using time-modulated parallel feeding with plain CRLH LWA for transmission, wherein N=10, N'=10.

FIGS. 12A-12B graphically illustrate BER performance of a receiver in 2D space when Tx is using time-modulated parallel feeding with plain CRLH LWA for transmission, wherein N=10, N'=20.

Figure 13B:
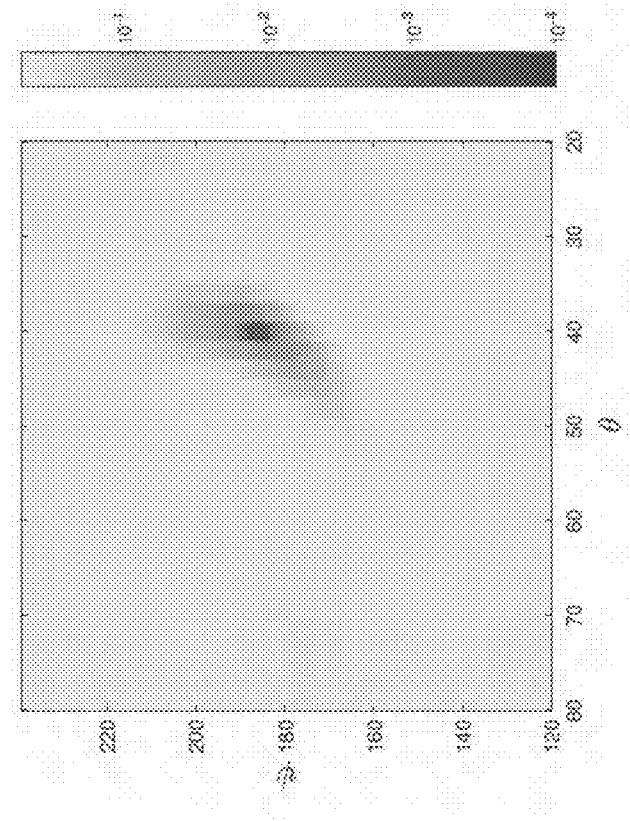
FIGS. 13A-13B graphically illustrate BERs for the decoding performance of a receiver corresponding to the configuration time-modulated parallel feeding with switch-enabled CRLH LWA proposed in Section 4.3, wherein N=10, N'=10.
Figure 13A:
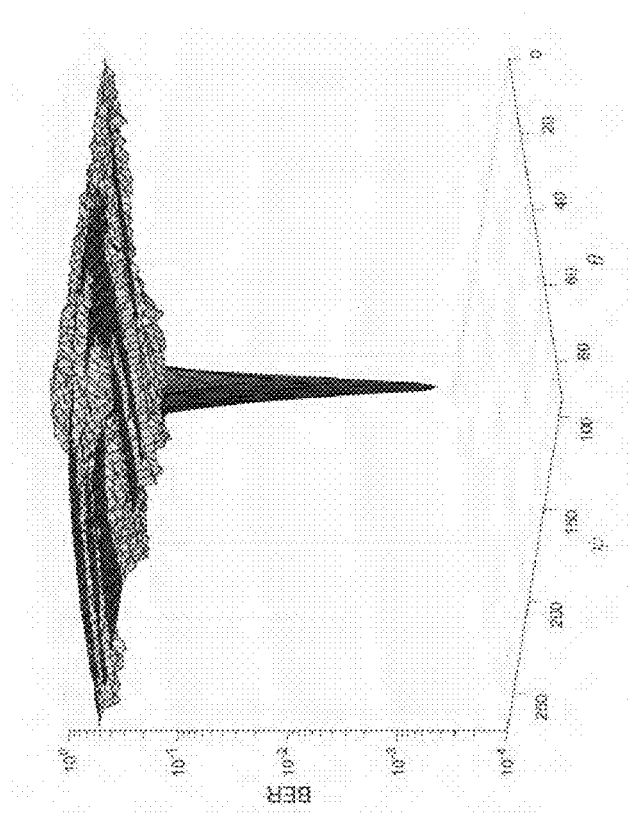

FIGS. 13A-13B graphically illustrate BERs for the decoding performance of a receiver corresponding to the configuration time-modulated parallel feeding with switch-enabled CRLH LWA proposed in Section 4.3, wherein N=10, N'=10.

Figures 14A, 14B:
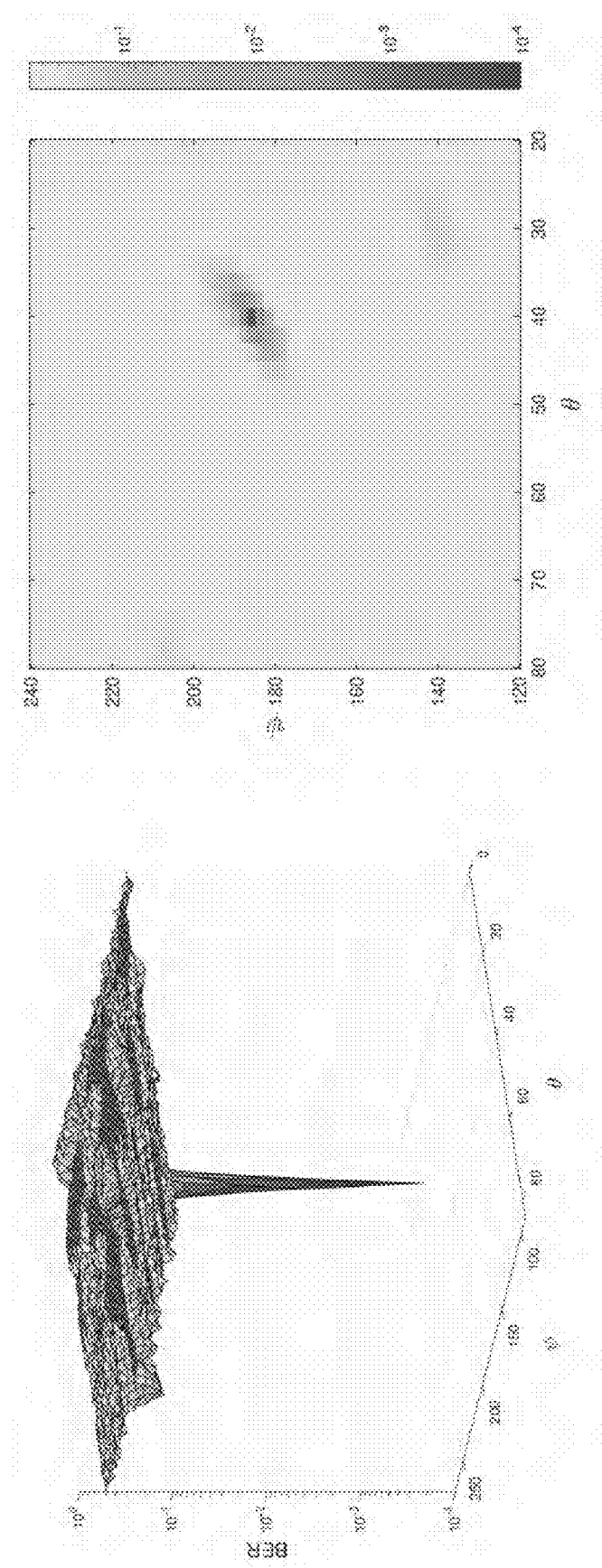
FIGS. 14A-14B graphically illustrate BERs for the decoding performance of a receiver corresponding to the configuration time-modulated parallel feeding with switch-enabled CRLH LWA proposed in Section 4.3, wherein N=10, N'=20.

FIGS. 14A-14B graphically illustrate BERs for the decoding performance of a receiver corresponding to the configuration time-modulated parallel feeding with switch-enabled CRLH LWA proposed in Section 4.3, wherein N=10, N'=20.

FIG. 12 illustrates the BER simulations across the 1D space as a function of the angle between the Rx and Tx under the assumption of perfect synchronization and AWGN channel at an SNR of $E_b/N_0$=8 dB. These assumptions make the current analysis a best-case scenario for the adversary as they may not be totally realizable depending on the underlying physical circumstances, which would subsequently deteriorate the decoding performance. Here $E_b/N_0$ is measured along the desired secure communication direction, and the noise power is assumed identical along every direction. Two choices of $E_b/N_0$ are equivalent to different distances between transmitter and receivers that include the legitimate one along the desired angle and potential eavesdroppers along all other directions. FIG. 12 shows that by tuning the constituent unit cells based on the input modes described in Section 3.1, the time-modulated LWA radiates the signal in a certain desired angle for which low BERs are achievable as the received signal is interference-free. By distancing from this angle, on the other hand, the received signal is more and more corrupted which precludes a receiver from achieving decoding performances with high reliability.

Figure 15:
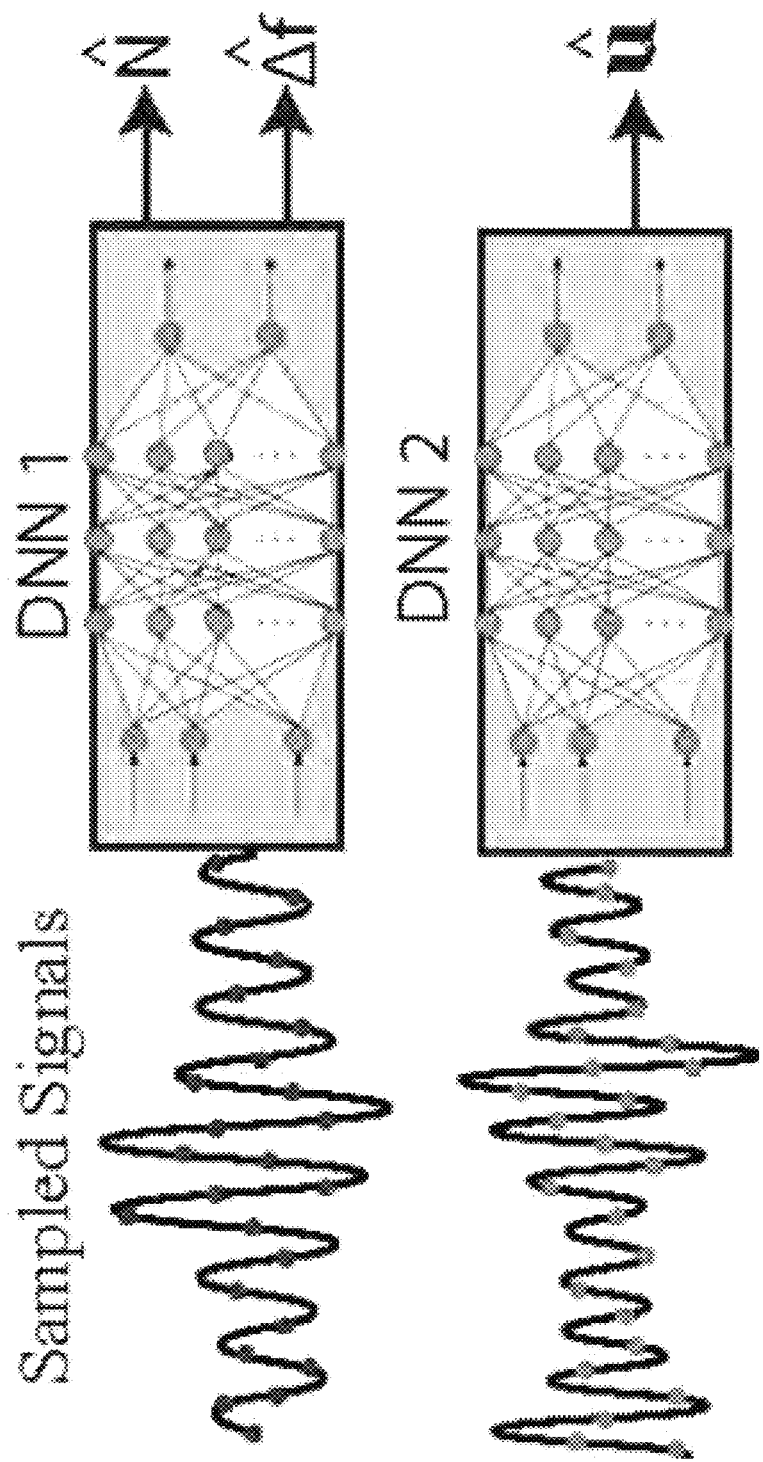
FIG. 15 depicts block diagrams of a pair of deep neural networks (DNNs) suitable for use by an adversary in estimating transmission parameters.
Figure 16:
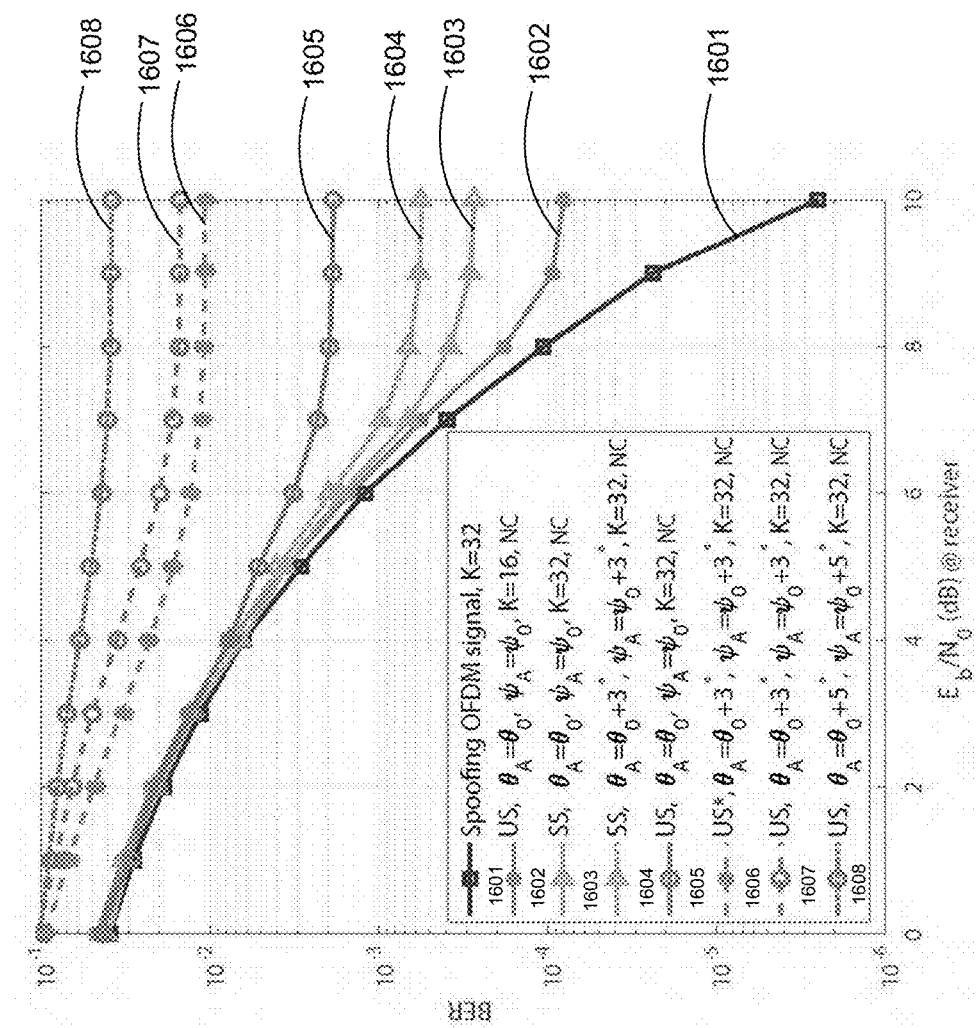
FIG. 16 graphically depicts BER at the Rx associated with the spurious data sent by an adversary launching either a supervised spoofing (SS) or an unsupervised spoofing (US) attack.

Next is considered a scenario where Tx, Rx and adversary are placed in a 2D space where Tx utilizes the proposed configurations proposed in Sections 4.2 and 4.3 for transmission. First is investigated the performance of the passive eavesdropping assuming the OFDM signal is being transmitted. Here, the OFDM carrier frequency is set to $f_0$=4.9 GHz and a tunable LWA, as described in Section 3.1, is used at each branch to enable beam scanning at a fixed frequency. The desired angles are set to $\theta_0$=400 and $\psi_0$=186°. For the switches in each branch and the switches between unit cells, various embodiments have used an identical on-time duration of $\Delta t/T_p$=1/N and $\Delta t/T_p$=1/N', respectively, where $T_g$ is set to be $T_0$. The BER decoding performances are reported as a function of a receiver's spatial angles with respect to the Tx, and $E_b/N_0$=8 dB which is computed in a similar fashion to the case of FIG. 12. The results for the configuration Time-Modulated parallel feeding with plain CRLH LWA are presented in FIGS. 13 and 14, which have result in a 2D directed modulation scheme. By comparing FIGS. 13 and 14, it is shown that number of unit cells in each branch plays an important role towards achieving a BER performance with a narrow lobe. Moreover, FIGS. 15 and 16 present the results obtained from the time-modulated parallel feeding with switch-enabled CRLH LWA configuration. In fact, for the same number of unit cells and branches, one can see that the latter scheme would result in much narrower BER lobe by employing the proposed time-modulated LWAs.

Next is investigated the resilience of the proposed configurations against state-of-the-art PHY spoofing attacks as an instance of the active adversary scenario. To this end, it is assumed that the adversary is equipped with resources to build a dataset out of the received signals and lunch a data-driven attack based on deep learning algorithms. These algorithms are powerful tools for extracting structural information from a given dataset when labels are not available (unsupervised), or finding a mapping function to the available labels (supervised). The labels used herein correspond to specific transmission parameters, i.e., subcarrier occupancy pattern (v), total number of subcarriers (K) and the subcarrier width $\Delta f$.

For supervised spoofing (SS) attacks, consider two deep neural networks (DNNs) illustrated in FIG. 15 for estimating the transmission parameters. The input to each DNN is the concatenation of the real and imaginary parts corresponding to the samples of a received signal while the output is set to be estimated transmission parameter(s). Also, the architecture of each DNN is presented in Table 1. Regarding training, minimize the $l_2$-loss between the true labels and output of each DNN using an Adam optimizer with a learning rate of 0.0001 for mini-batches of size 100.

TABLE 1

| | Hidden layer index | | | |
|---|---|---|---|---|
| | 1 | 2 | 3 | 4 |
| DNN 1 | 200 | 400 | 400 | 100 |
| DNN 2 | 400 | 600 | 400 | 100 |

The various embodiments address unsupervised spoofing (US) attacks using the variational auto-encoders (VAEs) which are based on the idea of variational inference. By training a VAE on a dataset of NC-OFDM signals, important PHY characteristics can be inferred through the analysis of the latent variables. In a US attack a DNN (encoder) is aimed at capturing information from the NC-OFDM signals which can be used by a second DNN (decoder) to reconstruct the signal. This information is encoded in the fixed number of latent variables. A US attack first identifies those latent variables which are used by the decoder, and refers to them as informative latent variables. The number of informative latent variables is related to the total number of subcarriers K. Furthermore, through the latent traversal technique, the value of an informative latent variable is shown to be related to the amount of power in a certain subcarrier. As there is zero power associated with an inactive subcarrier, this procedure would lead to estimation of the subcarrier allocation pattern (v).

In terms of specifics of the attack model, the transmission is assumed to take place over an NC-OFDM scheme with $\Delta f \in [15,30,45,60]$ KHz and $p_n \in [1,2]$ utilizing QPSK modulation with random subcarrier occupancy pattern using the total number of subcarriers K=16 and K=32, which give rise to $2^{16}$ and $2^{32}$ distinct subcarrier occupancy patterns, respectively. Adversary overhears the transmissions at a certain spoofing SNR and builds up a dataset out of the received noisy signals where 80 complex samples are collected from each signal. The size of the training and the test dataset is set to $2 \times 10^6$ and $25 \times 10^4$, respectively. FIG. 16 graphically illustrates the spoofing performance for several supervised and unsupervised learning algorithms when the adversary receives signal from different $\theta$ and $\psi$ angles. The channel between the Tx and adversary is assumed to be a multi-path fading channel with amplitudes [1,0.8,0.6] and delays [0,2, 4] $\mu s$, and a Rayleigh flat-fading for both of the Adversary-Rx and Tx-Rx channels. For the unsupervised cases, it is assumed that the adversary is utilizing the VAE model to infers the total number of subcarriers and the corresponding latent variable for each subcarrier via latent traversal. During the test stage, it obtains the corresponding learned representation for a test signal and decides whether a subcarrier is active or inactive. For the supervised cases, the specifications of the DNNs are presented in Section 2.

FIG. 16 demonstrate the BER performance at Rx while decoding the spurious data sent by the adversary over a long range of SNR. As mentioned in Section 2, as the adversary's accuracy in estimating the transmission parameters improves, it can generate signals whose PHY characteristic is more similar to that of the Tx, and as a result the Rx will proceed with decoding the spurious data assuming the received signal is legitimate. Therefore, higher BERs here correspond to a transmission scheme which is more secure against PHY spoofing. For example, for the case of OFDM transmission the BER hits very small values as OFDM signals are particularly susceptible to PHY spoofing attacks. Here, there is a primary focus on the configuration proposed in Section 4.3, and an investigation into the performance of deep learning-based PHY spoofing attacks for the case that N=10 and N'=20.

In particular, FIG. 16 demonstrates the PHY spoofing performance for the OFDM and NC-OFDM systems. Firstly, for the case of OFDM signals, illustrated by curve 1601, the adversary is able to infer the true transmission parameters which result in the same BER performance as the baseline OFDM transmission. For the case of NC-OFDM systems, when the adversary receives signals in angles which are disturbed in comparison to the desired angles, the corresponding PHY spoofing attack is deteriorated. The $\theta$ and $\psi$ angles corresponding to the adversary's location with respect to the Tx are denoted by $\psi_A$ and $\theta_A$ here, respectively. The degree to which these received angles is perturbed, is particularly shown to exacerbate the adversary's performance. Notably, it is observed that when the difference between $\psi_A$ and $\theta_A$ is more than 7 degrees for this setting the BER at the Rx is close to 0.5 which indicates the complete failure of such attacks. Looking at the smaller perturbance levels depicted in FIG. 16, it is determined that the sophisticated deep learning-based spoofing attacks are affected at different levels by the proposed Tx architecture. Specifically, the received angles have much more detrimental effects on the performance of the US attack in comparison to the supervised one. This can be associated with the fact that unsupervised spoofing relies heavily on the structure of the received signals to find the subcarrier occupancy pattern. When the received signals are interfered due to the directed modulation functionality in the undesired angles, the resulting US spoofing performance is also substantially deteriorated. On the other hand, SS attacks have shown more resiliency against the variance of the received angles, although they rely on true labels for training which might not be easy to acquire for a malicious party in a real-world setting. Finally, FIG. 16 illustrates the US performance corresponding to the time-modulated parallel feeding with plain CRLH LWA architecture via the curve labeled as 'US*'. It is observed that this architecture has an inferior security level in comparison to the time-modulated parallel feeding with switch-enabled CRLH LWA structure proposed in Section 4.3.

6 CONCLUSIONS

Various embodiments propose transmission architectures to enhance the physical layer security through the utilization of MTM-LWAs. Specifically, in the proposed configurations, the DM functionalities of the TMAs are realized in 1-D and 2-D spaces through the MTM-LWAs which have much lower complexity in comparison to the classic alternatives like phased-arrays. Furthermore, the various embodiments exhibit resilience of these architectures against passive eavesdropping and active PHY spoofing attacks. For the former case, the TMAs with OFDM signals are considered while NC-OFDM transmission is employed for the latter scenario. In particular, it is assumed the adversary has access to state-of-the-art deep learning tools for PHY spoofing. It is shown as part of the numerical results that the proposed transmission schemes substantially enhance the physical layer security through the generation of highly directive beams which incur substantial interference to the adversary's received signal even with small perturbation with respect to the desired angles.

The time-modulated CRLH LWAs, such as described above with respect to the one-dimensional antenna of FIG. 7 and the multi-dimensional antenna of FIG. 9, may be used to switch each unicell between radiated mode and guided mode to create directional modulation using the harmonics generated by the switches. That is, by controlling the switching between the unicells, a directional modulation of a signal to be transmitted is achieved that provides physical layer security by causing the transmitted signal to exhibit a low bit error rate proximate an intended receiver, and a high BER in other locations (e.g., a location of an adversary).

The various embodiments provide high security due to the directionality. However, this directionality provides numerous other advantages and use case support, such as with respect to focused interaction with Internet of Things (IoT) devices while avoiding adversary spoofing and simply interference from proximate IoT devices. The various embodiments advantageously provide beamforming, but in in a manner where time modulation is operative to reduce the usual side lobes of a transmitted signal.

The embodiments described above such as with respect to FIG. 7 and FIG. 9 are depicted as having a specific structure. However, that structure may be modified in many respects in various alternate embodiments. For example, there may be more or fewer microstrip unit cells and/or switches therebetween, increased or decreased spacing p, non-uniform spacing p (i.e., different spacing between stages), the use of differing materials, the use of alternate modulation schemes, different means of controlling switch operation, different patterns for making the apparatus and components thereof.

It is noted that the modulation scheme OFDM is generally discussed with respect to the various embodiments. However, other modulation schemes may also be used. In addition to continuous or non-continuous OFDM, any single carrier or multicarrier modulation scheme may be used (e.g., QAM, BPSK and so on).

Various embodiments provide a physical layer security antenna array that can provide directional modulation in 2D space through the use of meta material antenna arrays with time modulation. By modulating the control waveforms for both feeding network and unicell of metamaterial antenna, there is provided a very flexible control of the radiation beam with PHY security such that at the desired angle in two dimensional space it has a very low BER such that the correct information is sent to the desired location while other locations have high BER/distorted signals.

Various embodiments use time modulation with leaky-wave antennas to provide physical security. Prior 2D steering of the antennas without using multiple antennas spread out geographically or at different locations (e.g., phased array antennas as is known), whereas the various embodiments provide a series of linear leaky-wave antennas implementing beam forming and time modulation in a compact architecture to provide high BER of a transmitted signal at non-receiver locations.

Figure 17:
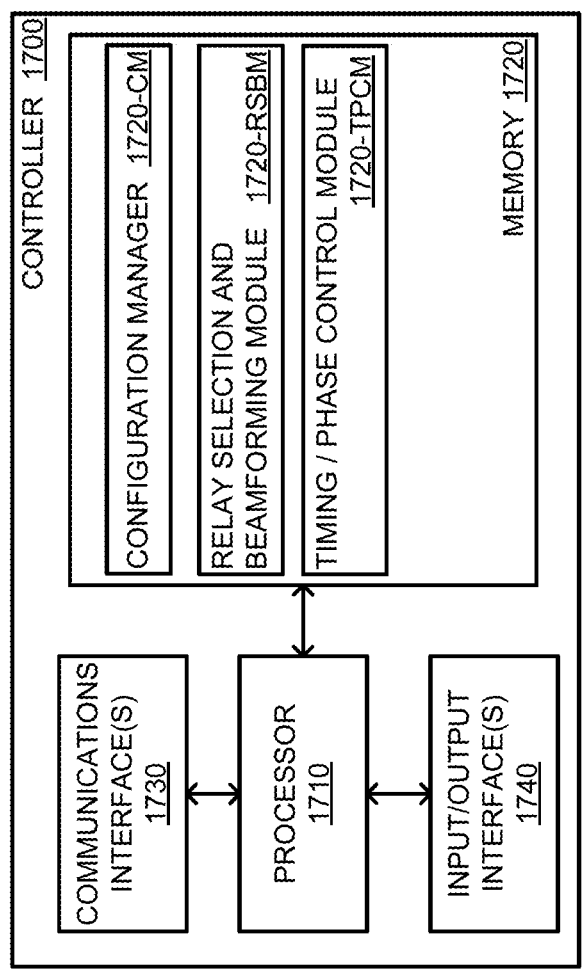
FIG. 17 depicts a high-level block diagram of a computing device configured for implementing a controller function according to various embodiments.

FIG. 17 depicts a high-level block diagram of a computing device or controller 1700 configured for implementing a controller function according to one embodiment and suitable for use in performing the various functions as described herein. The controller function may be used to control the operation of one or more time-modulated CRLH LWAs such as described above with respect to the various embodiments.

It will be appreciated that the controller 1700 described herein may be located within a network (not shown) including various provider equipment, network management equipment, and so on. The controller function may also be used at a transmission point, such as a fixed or portable transmitter configured to use various embodiments such as discussed above.

As depicted in FIG. 17, controller 1700 includes a processor element 1710 (e.g., a central processing unit (CPU) or other suitable processor(s)), a memory 1720 (e.g., random access memory (RAM), read only memory (ROM), and the like), a communications interface 1730 (e.g., one or more interfaces enabling communications via a wireless communication network such as a 3G/4G/LTE/5G wireless network, an optical fiber link and the like), and an optional input/output interface 1740 (e.g., GUI delivery mechanism, user input reception mechanism, web portal interacting with remote workstations and so on).

It will be appreciated that the controller 1700 depicted in FIG. 17 provides a general architecture and functionality suitable for implementing functional elements described herein or portions of the functional elements described herein. Further, it will be appreciated that the functions depicted and described herein may be implemented in hardware or in a combination of software and hardware, e.g., using a general purpose computer, one or more application specific integrated circuits (ASIC), or any other hardware equivalents. In one embodiment, computer instructions are loaded into memory 1720 and executed by processor 1710 to implement the functions as discussed herein. The various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

The communications interface 1730 facilitates communications with various elements within or related to a network or transmitter configured or operating in accordance with the embodiments.

The memory 1720 is depicted as storing computer instructions executable by the processor 1710 to implement various functions associated with the network 100 of FIG. 1, such a configuration manager 1720-CM, a relay selection and beamforming module 1720-RSBM, and/or a timing/phase control module 1720-TPCM.

The configuration manager 1720-CM is used to manage the various elements of a network or transmitter configured to use the time-modulated CRLH LWAs such as described above with respect to the various embodiments. Such elements may be implemented at base stations, eNodeBs, relays, relay clusters, nodes, sounders, and various other types of transmitting devices, both portable and fixed.

The relay selection and beamforming module 220-RSBM operates to select appropriate relays/switches for use in forwarding a signal, as well as determining the beamforming characteristics to be used in forwarding that signal, as described above.

The cluster timing/phase control module 220-CTPCM supports timing and/or phase control mechanisms suitable for use in enabling the various time-modulated CRLH LWAs such as described above.

Further embodiments are now discussed with respect to a time modulated metamaterial (MTM) antenna array transmitter capable of realizing 2D directional modulation (DM) for physical layer (PHY) security. The 2D DM MTM antenna array is formed by a time modulated corporate feed network loaded with composite right/left-handed (CRLH) leaky wave antennas (LWAs). By properly designing the on-off states of the switch for each antenna feeding branch as well as harnessing the frequency scanning characteristics of CRLH LWAs, 2D DM can be realized to form a PHY secured transmission link in the 2D space. Experimental results demonstrate the bit-error-rate (BER) is low only at a specific 2D angle for the orthogonal frequency-division multiplexing (OFDM) wireless data links.

1 INTRODUCTION

Directional modulation (DM)-based physical-layer (PHY) security for wireless communication systems has advanced rapidly in recent years, owing to its ability to create wireless link at a specific direction with low bit-error-rate (BER). One way to realize DM is based on a time-modulated array (TMA), where the excitation of each array element is periodically enabled and disabled with the use of switches. By properly choosing the control waveform of switches, DM can be synthesized in a way that the signal is transmitted in a desired angle and distorted in all other unwanted angles, thereby resulting in PHY security.

Nevertheless, most of the reported TMA-based DM schemes can only provide PHY security in the 1D space, which may limit the applications where 2D secured links are needed. The various embodiments provide a DM scheme where using CRLH MTM LWA as antenna elements with frequency dependent beam scanning characteristics for TMA. Such integration enables a 2D DM where a secured angle can be formed for both azimuth and elevation directions. As proof-of-concept, a prototype of TMA containing four CRLH MTM LWAs is designed and developed, in which both simulated and measured results for the BER show that the proposed MTM TMA can preserve the signal in desired direction while distorting it in all other angles in 2D space.

2 OPERATING PRINCIPLES

Figure 18:
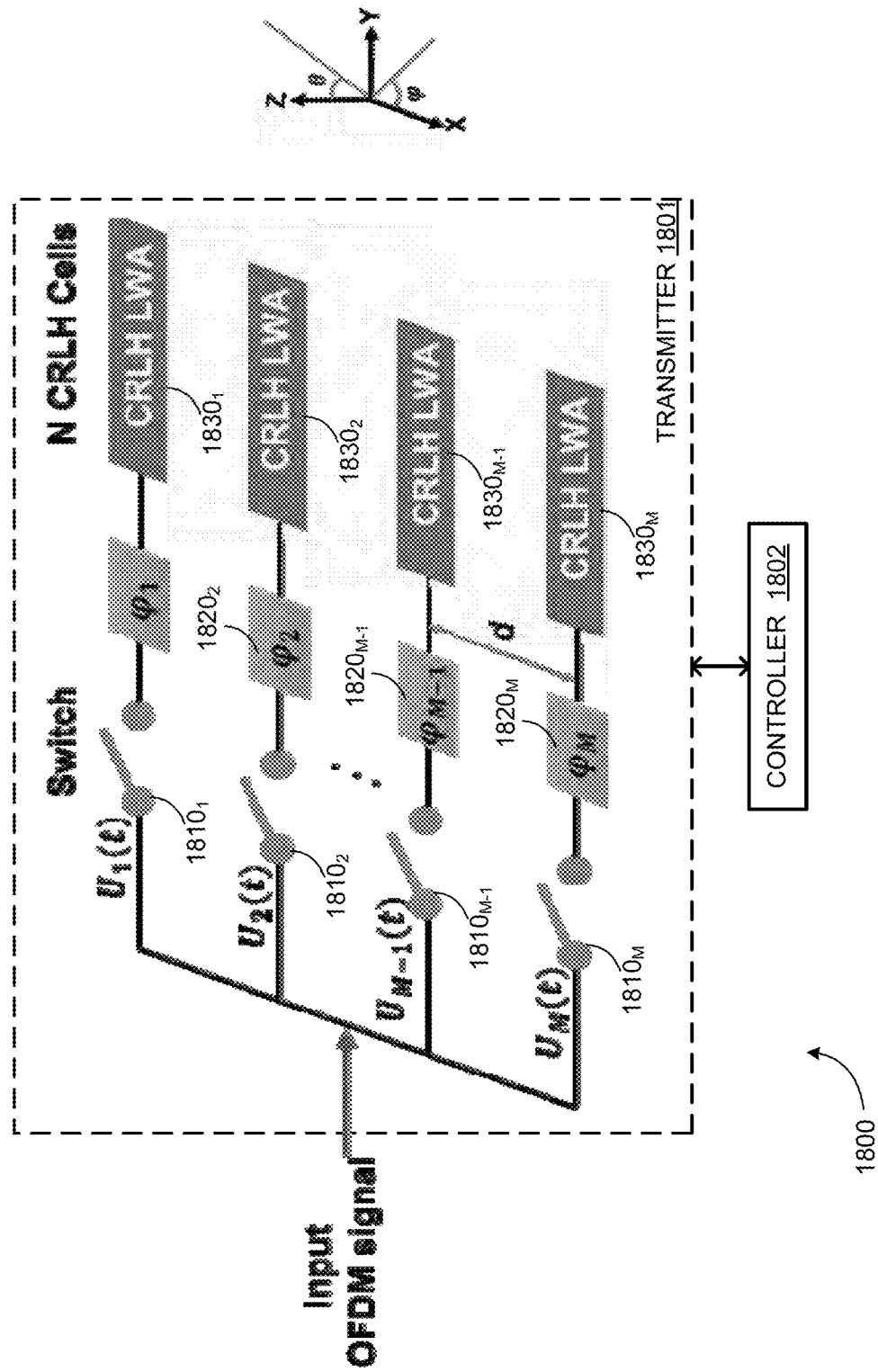
FIG. 18 depicts an embodiment of a time modulated CRLH LWA.

FIG. 18 depicts an embodiment of a 2D directional modulation (DM) transmitter. Specifically, transmitter 1800 of FIG. 18 comprises a time-modulated array (TMA) 1801 formed as a plurality of TMA branches (illustratively M branches, where M is an integer greater than 1), optionally controlled via a controller 1802.

As depicted, each of the M TMA branches comprises an RF switch 1810, a phase-delay module 1820, and a composite right/left-handed metamaterial leaky-wave antenna (CRLH MTM LWA). An input signal, such as an OFDM signal to be transmitted, is provided to each of the M branches for subsequent transmission in accordance with respective on-off state timing of the branches (i.e., $U_1(t)$ through $U_M(t)$), the on-state being selected via a control signal imparted to the corresponding switch 1810 via, illustratively, the controller 1802 or other control or timing mechanism. Each branch phase delay module configured to receive the common input signal and provide a respective phase delayed input signal to the respective branch CRLH MTM LWA for transmission thereby during an on-state of the branch. The CRLH MTM LWA of each branch being separated from a CRLH MTM LWA of an adjacent TMA branch by a distance d. The branch on-off states are controlled in a manner causing directional modulation (DM) of the transmission signal such that the transmission signal exhibits a low bit error rate (BER) to a receiver at a desired location.

Referring to FIG. 18, the proposed configuration utilizes CRLH MTM LWAs as antenna elements at the end of each branch of TMA. By using pin diodes as RF switches in each branch and controlling the on-off state, denoted as $U_m(t)$, the radiation pattern can be obtained by following:

$$R(t, \theta, \varphi) = S(t)\sum_{m=1}^{M} U_m(t)e^{jk_0 d(m-1)\sin\theta\cos\varphi + j\varphi_m} \times \sum_{n=1}^{N} I_n e^{jk_0 p(n-1)\sin\theta\sin\varphi + j\zeta_n} \quad (26)$$

where S(t) is the input signal, $$\varphi_m = -(m-1)k_0 d\sin\theta_0\cos\varphi_0, \; I_n = I_0 e^{-\alpha(n-1)p} \quad (27)$$

$$\zeta_n = -(n-1)k_0 p\sin\gamma, \; \gamma = \sin^{-1}\left(\frac{\beta(\omega)}{k_0}\right) \quad (28)$$

while M is the number of branches and N is the number of cells in each CRLH MTM LWA, $k_0$ is the free space wave number, d is the distance between the adjacent LWAs, $\gamma$ is the main beam angle for an individual LWA (which is a function of frequency), p is the length of CRLH unit cell, $\alpha$ is the leakage factor, and $\beta(\omega)$ is the phase constant of CRLH transmission line.

So, for focusing the main beam of the 2D prototype to the point $(\theta_0,\varphi_0)$, the input frequency should be tuned to have:

$$\sin\theta_0\sin\varphi_0 = \sin\gamma \quad (29)$$

and the required phase shift of the signal in each branch should be given by $\varphi_m$.

In addition, $U_m(t)$ is a periodic square switching waveform starting at time $t_m^s$ and ending at $t_m^e$, which can be defined as:

$$U_m(t) = \begin{cases} 1 & \text{if } t_m^s \leq t \leq t_m^e, \\ 0 & \text{otherwise,} \end{cases} \quad (30)$$

and $$U_m(t) = \begin{cases} 1 & \text{if } 0 \leq t \leq t_m^e, \\ 1 & \text{if } t_m^s \leq t \leq T_p, \\ 0 & \text{otherwise,} \end{cases} \quad (31)$$

for the cases $t_m^e > t_m^s$ and $t_m^e < t_m^s$, respectively.

Here, $$T_p = \frac{1}{f_p}$$

denotes the period of the switching waveform. By expanding $U_m(t)$ in terms of the Fourier series, the following is obtained:

$$R(\theta, \varphi, t) = \frac{1}{\sqrt{M}} S(t) \tag{32}$$

$$\left( \sum_{n=1}^{N} I_0 e^{-\alpha(n-1)p} e^{j(n-1)k_0 p \sin\theta \sin\varphi + j\zeta_n} \right) \times \sum_{m=-\infty}^{\infty} V(t, i, M, T_m^s, \Delta t_m, \theta, \varphi)$$

where $$\sum_{m=1}^{M} \left( \frac{\sin(i\pi f_p \Delta t_m)}{i\pi} e^{j2\pi i f_p (t - T_m^s - \Delta t_m/2)} \right) \times e^{jk_0 d(m-1)(\sin\theta\cos\varphi - \sin\theta_0 \cos\varphi_0)} \tag{33}$$

The on-time period for the $m^{th}$ switch is less than $T_p$ and may be equated to $\Delta t_m = t_m^e - t_m^s$ when $t_m^e > t_m^s$, or $\Delta t_m = T_p + t_m^e - t_m^s$ when $t_m^e < t_m^s$. It can be shown that by providing specific delay between $U_m(t)$'s with the same duty cycle $\Delta t$, the input signal along $(\theta_0, \varphi_0)$ during transmission is preserved while being distorted along other directions. The DM can be achieved if the switch parameters are chosen as follows:

$$\frac{t_m^s}{T_p} \in \left\{ \frac{w-1}{M} \middle| w = 1, 2, \ldots, M \right\} \tag{34}$$

$$\frac{\Delta t}{T_p} \in \left\{ \frac{w-1}{M} \middle| w = 1, 2, \ldots, M \right\} \tag{35}$$

Finally, by sweeping the carrier frequency ($f_0$) in the fast wave region of LWAs and providing appropriate $\varphi_m$ through the use of external phase shifters, beam scanning in the 2D space is achieved. Moreover, thanks to the time-modulation technique, the signal is preserved in the desired direction while being distorted in all other unintended directions in the 2D, thereby enabling the PHY security.

3 DESIGN AND EXPERIMENTAL VERIFICATION

Figure 19:
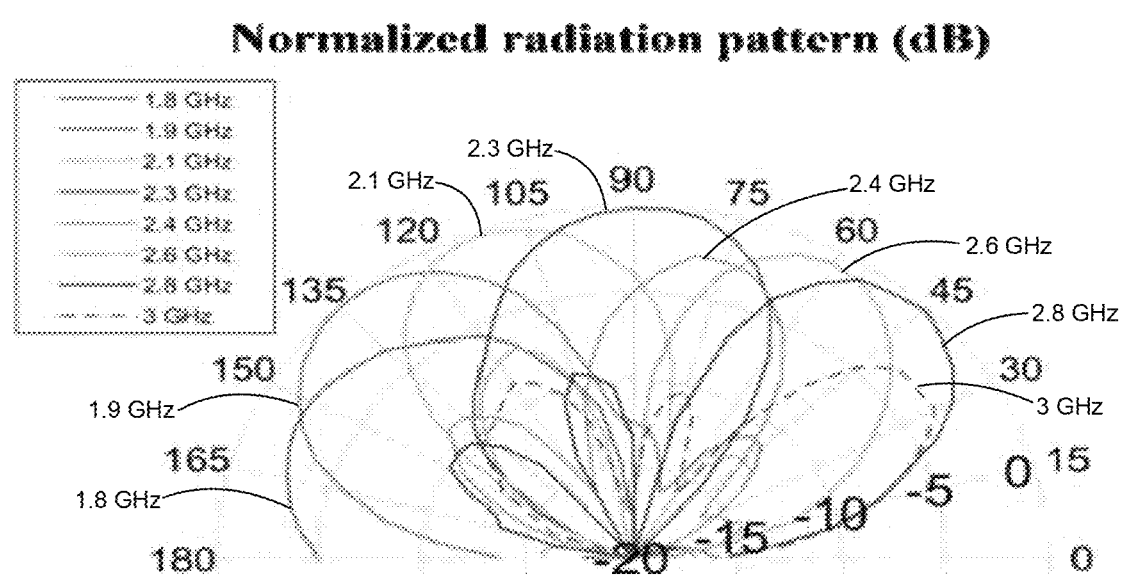
FIG. 19 illustrates a radiation pattern for an exemplary 2D DM MTM array where N=12 and M=4.

In a some embodiments, the time-modulated Array (TMA) contains four composite right/left-handed (CRLH) MTM Leaky Wave Antennas (LWAs), in which both simulated and measured results for the BER show that the proposed MTM TMA can preserve the signal in desired direction while distorting it in all other angles in 2D space. This embodiment was used as a proof-of-concept 2D DM MTM array, and includes 12 CRLH cells with interdigital capacitors and shunt stub inductors cascaded to realize the CRLH LWAs to form a four-element array (i.e., N=12, M=4). The center frequency of the unit cell is designed to be 2.3 GHz with the fast wave region ranging from 1.9 to 3.5 GHz, in which the measured radiation patterns of fabricated LWAs are shown in FIG. 19.

Figure 20A:
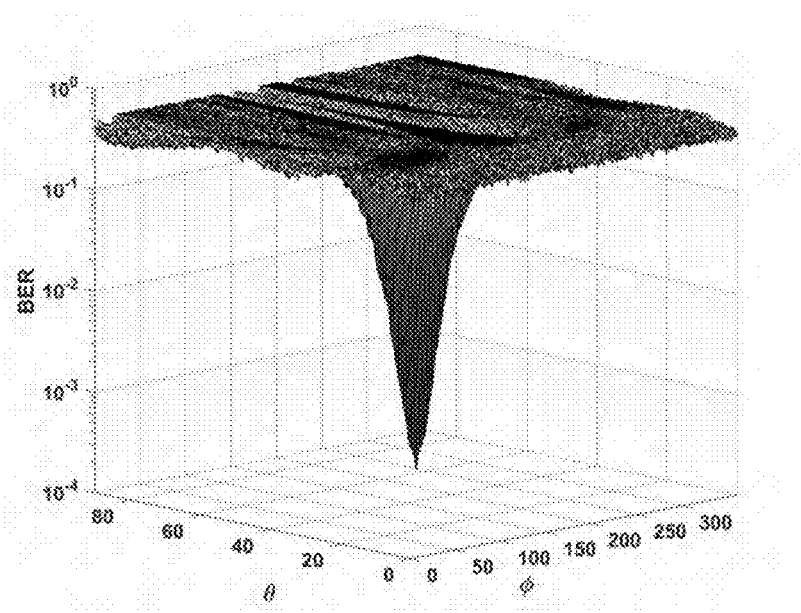
FIGS. 20A-20B graphically illustrate BERs for the decoding performance of a receiver corresponding to the proof of concept 2D DM MTM array, with and without time modulation, respectively.
Figure 20B:
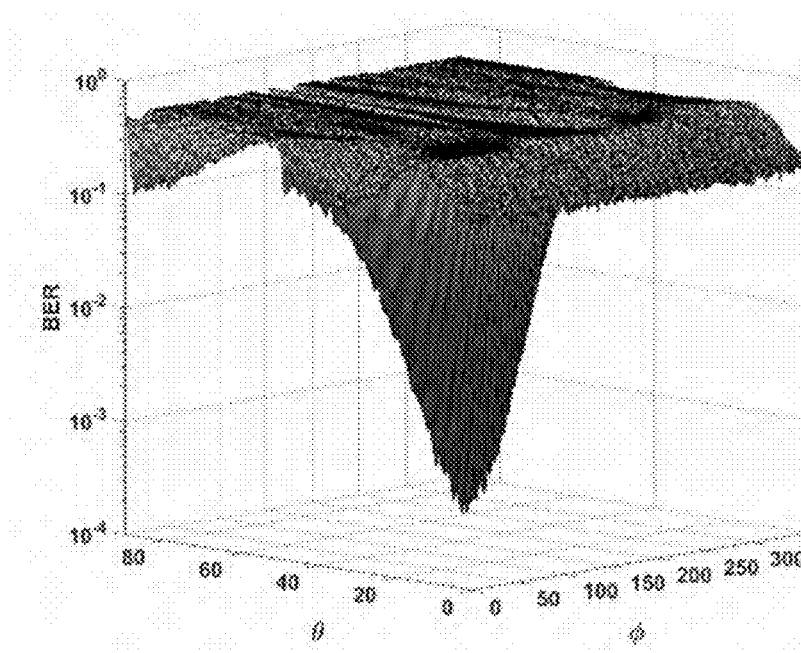

FIGS. 20A-20B graphically illustrate BERs for the decoding performance of a receiver corresponding to the exemplary 2D DM MTM array where N=12 and M=4, with and without time modulation, respectively. The distance between branches (d) is equal to 6.5 cm and the length of the unit cell (p) is 11.4 mm. In this scenario, the carrier frequency is 2.3 GHz and the number of OFDM sub-carriers is 16. In addition, QPSK is used as the modulation scheme for OFDM transmission with SNR per bit equal to 8 dB and $\theta_0=45°$, $\varphi_0=180°$. It can be observed that with the time modulation, in undesired angles higher BER is obtained in comparison with the case without the time modulation, demonstrating the feasibility of PHY security enhancement.

In an experimental configuration, the proof-of-concept 2D DM MTM array is injected with an OFDM input signal with 16 sub-carriers using a QPSK modulation scheme; BER is measured for several different cases. The time modulated antenna feed network is realized by a one-to-four Wilkinson power divider with PIN diodes (SMP1345 from Skyworks) used as RF switches. Moreover, phase shifters and CRLH LWAs are connected to the end of each branch of the time modulated feed network, respectively.

The control signals for the switches are realized using function generators or other control circuitry (e.g., controllers 1700 or 1802) in accordance with equations (34) and (35). A broadband Vivaldi antenna located in the far field region is used as a receive antenna. The measured BER results are obtained through commercially available software-defined radio (SDR) modules connected to both transmit and receive antennas, as shown in FIGS. 21-24, where GNU Radio interface is used to implement the IEEE 802.11 standard for transmission and reception of OFDM packets with QPSK modulation over an AWGN channel.

Figure 21:
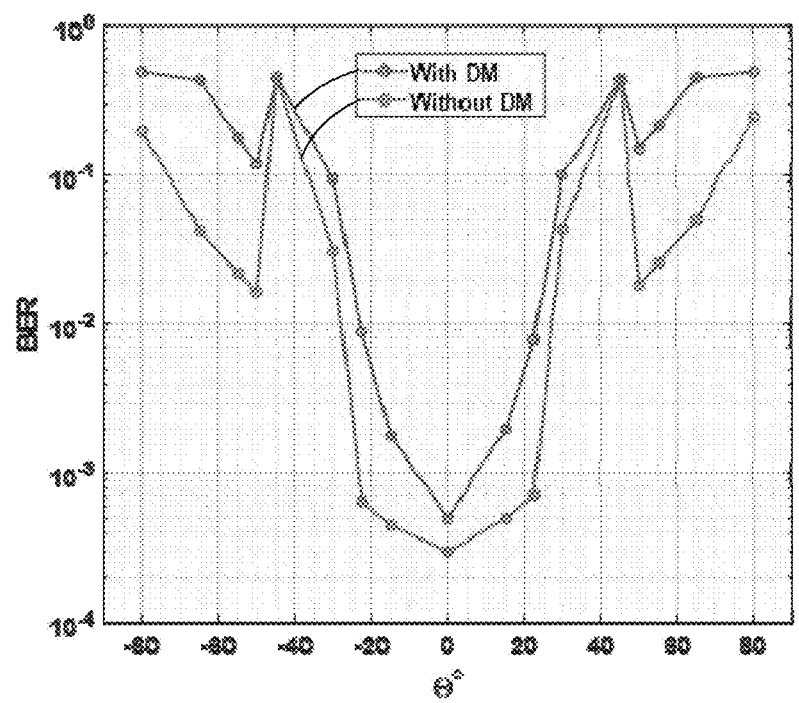
FIGS. 21-24 graphically illustrate BER of the experiment associated with the proof of concept 2D DM MTM array.

FIG. 21 graphically illustrates BER of the experiment associated with a main beam set to be $\theta_0=0°$ where $\theta$ is swept from zero to 90° in $\varphi=0°$ and $\varphi=1800$ planes.

Figure 22:
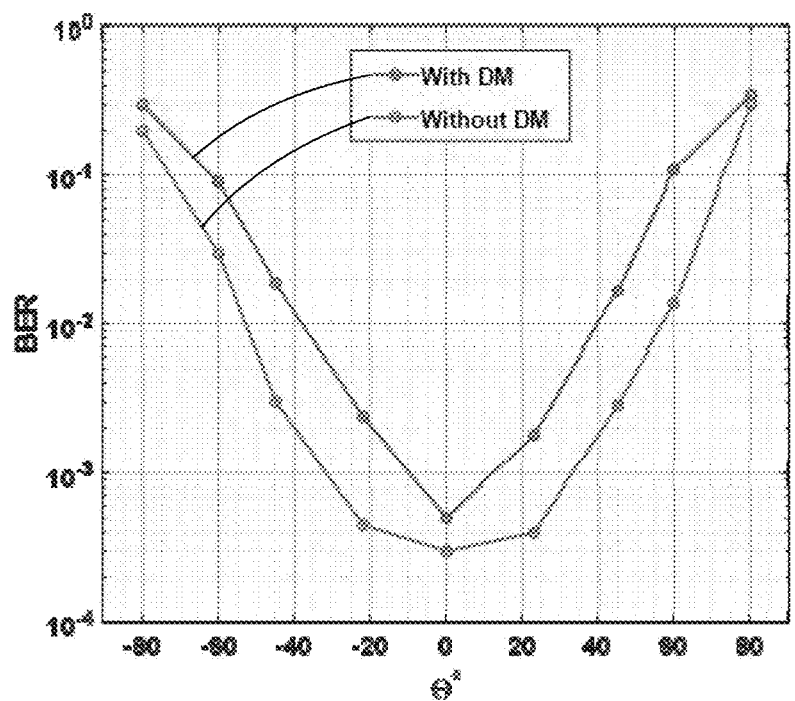

FIG. 22 graphically illustrates BER of the experiment associated with a main beam set to be $\theta_0=0°$ where $\theta$ is scanned from zero to 90° in the $\varphi=850$ and $\varphi=2650$ planes.

Figure 23:
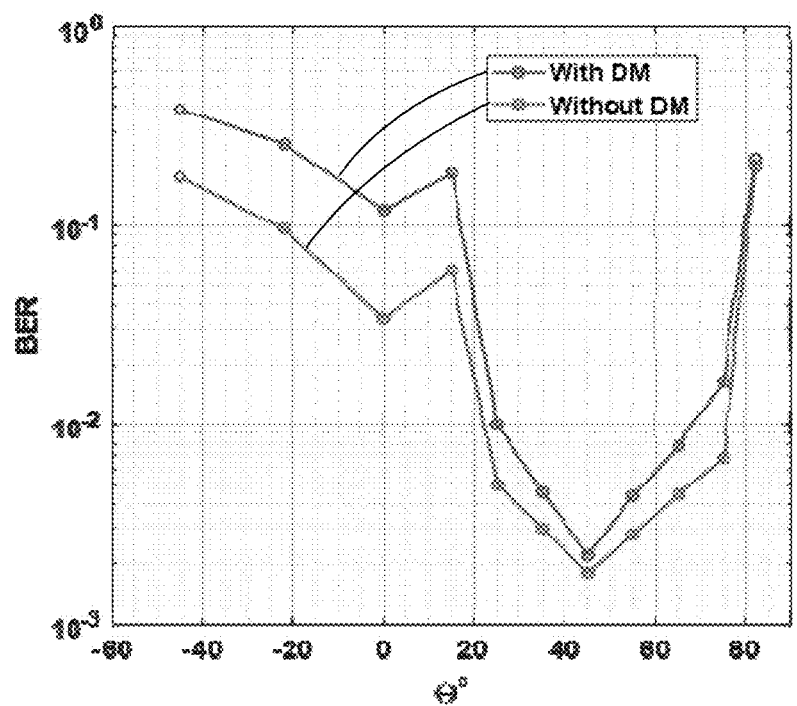

FIG. 23 graphically illustrates BER of the experiment associated with phase shifters and input frequency are adjusted to set $\theta_0=45°$, $\varphi_0=180°$, and $\theta$ is swept from zero to 90° in $\varphi=0°$ and $\varphi=1800$ planes.

Figure 24:
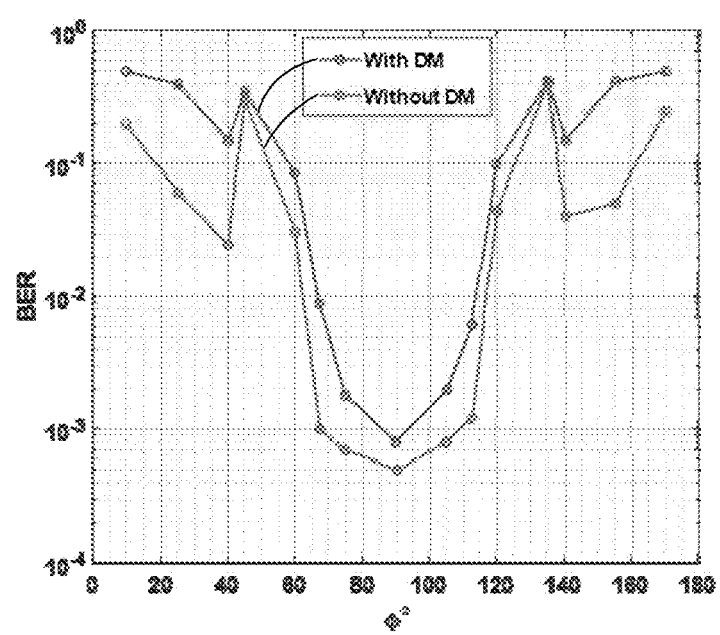

FIG. 24 graphically illustrates BER of the experiment associated with changing the input frequency to 2.7 GHz such that the main beam becomes $\theta_0=40°$, $\varphi_0=90°$ and the $\varphi$ is swept from 0° to 180° at $\theta=40°$.

The results illustrated by FIGS. 21-24 demonstrate the enhancement of PHY security after enabling the time modulation waveforms for DM. In particular, it is shown that the BERs are very low for the cases with and without DM in the desired angle, whereas the BER is much higher at the undesired angles with DM.

4 CONCLUSION

Thus, a time modulated DM transmitter using CRLH MTM LWA as antenna elements enables 2D DM for PHY security. Experimental results by transmitting OFDM signal using the proposed 2D DM MTM array demonstrate a very low BER in the desired 2D angle, while much higher BER can be observed in all other undesired angles in comparison with the case without DM. The proposed 2D DM MTM array can be utilized to transmit PHY secured signals for wireless communications in the 2D space.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A transmitter, comprising:
   first and second transmission lines, each transmission line comprising a predefined number of unit cells separated from each other by a distance p, each first transmission line unit cell cooperating with a corresponding second transmission line unit cell to form thereby a respective unit cell stage having two inputs and two outputs; and
   a plurality of DPDT switches, each DPDT switch disposed between respective prior and subsequent unit cell stages;
   wherein the second transmission line unit cells comprise microstrip unit cells configured to propagate therethrough an input signal to provide thereby a transmission signal configured for free space radiation;
   wherein the first transmission line unit cells comprise lumped element unit cells having a circuit model equivalent to that of corresponding second transmission line microstrip unit cells;
   wherein the DPDT switches are controlled in a manner causing directional modulation (DM) of the transmission signal such that the transmission signal exhibits a low bit error rate (BER) to a receiver at a desired location.

2. The transmitter of claim 1, wherein the input signal comprises a dual carrier modulated signal.

3. The transmitter of claim 1, wherein the input signal comprises a single carrier modulated signal.

4. The transmitter of claim 1, wherein the input signal comprises an OFDM modulated signal.

5. The transmitter of claim 4, wherein the OFDM modulated signal comprises a non-contiguous (NC) OFDM modulated signal.

6. The transmitter of claim 1, wherein each of the first and second transmission lines comprise respective cascades of composite right/left-handed unit cells configured to form thereby a metamaterial leaky-wave antenna (CRLH LWA).

7. The transmitter of claim 6, further comprising:
   at least one additional CRLH LWA, wherein each CRLH LWA is separated from an adjacent CRLH LWA by a distance d; and
   a plurality of phase delay modules, each phase delay module configured to receive a respective common input signal and provide a respective phase delayed input signal to a respective CRLH LWA.

8. The transmitter of claim 7, further comprising a power divider configured to divide an input signal into a plurality of common input signals for use by respective phase delay modules.

9. The transmitter of claim 6, wherein the transmitter comprises time-modulated array (TMA) formed as a plurality of TMA branches, each TMA branch configured to receive a common input signal for transmission thereby;
   each TMA branch comprising a phase delay module and a composite right/left-handed metamaterial leaky-wave antenna (CRLH MTM LWA), the phase delay module configured to receive the common input signal and provide a respective phase delayed input signal to the respective CRLH MTM LWA for transmission thereby during an on-state of the branch, the CRLH MTM LWA being separated from a CRLH MTM LWA of an adjacent TMA branch by a distance d;
   each branch having an on-off state controlled in a manner causing directional modulation (DM) of the transmission signal such that the transmission signal exhibits a low bit error rate (BER) to a receiver at a desired location.

10. The transmitter of claim 9, wherein each TMA branch further includes a radio frequency (RF) switch configured to couple the common input signal to a respective phase delay module during an on-state of the TMA branch.

11. The transmitter of claim 9, wherein:
    the TMA transmitter comprises M TMA branches, wherein M is an integer greater than 1; and
    each CRLH MTM LWA comprises N CRLH cells, wherein N is an integer greater than 1.

12. The transmitter of claim 1, wherein the DM is controlled to provide a usable modulated signal in a desired 2D space.

13. A 2D directional modulation (DM) transmitter, comprising:
    a time-modulated array (TMA) formed as a plurality of TMA branches, each TMA branch configured to receive a common input signal for transmission thereby;
    each TMA branch comprising a phase delay module and a composite right/left-handed metamaterial leaky-wave antenna (CRLH MTM LWA), the phase delay module configured to receive the common input signal and provide a respective phase delayed input signal to the respective CRLH MTM LWA for transmission thereby during an on-state of the branch, the CRLH MTM LWA being separated from a CRLH MTM LWA of an adjacent TMA branch by a distance d;
    each branch having an on-off state controlled in a manner causing directional modulation (DM) of the transmission signal such that the transmission signal exhibits a low bit error rate (BER) to a receiver at a desired location.

14. The TMA transmitter of claim 13, wherein each TMA branch further includes a radio frequency (RF) switch configured to couple the common input signal to a respective phase delay module during an on-state of the TMA branch.

15. The TMA transmitter of claim 13, wherein:
    the TMA transmitter comprises M TMA branches, wherein M is an integer greater than 1; and
    each CRLH MTM LWA comprises N CRLH cells, wherein N is an integer greater than 1.

16. A 2D directional modulation (DM) transmission method, comprising:
    receiving a common input signal for transmission at each of a plurality of branches of a time-modulated array (TMA);
    each TMA branch imparting a respective a phase delay to a received common input signal and, during an on-state of the TMA branch, transmitting the respective phase delayed common input signal via a respective composite right/left-handed metamaterial leaky-wave antenna (CRLH MTM LWA) separated from a CRLH MTM LWA of an adjacent TMA branch by a distance d;
    each branch having an on-off state controlled in a manner causing directional modulation (DM) of the transmission signal such that the transmission signal exhibits a low bit error rate (BER) to a receiver at a desired location.

* * * * *